(12) United States Patent
Quan et al.

(10) Patent No.: US 10,470,234 B2
(45) Date of Patent: Nov. 5, 2019

(54) COMMUNICATION METHOD, NETWORK-SIDE DEVICE, AND USER EQUIPMENT

(71) Applicant: Huawei Technologies Co., Ltd., Shenzhen, Guangdong (CN)

(72) Inventors: Wei Quan, Beijing (CN); Jian Zhang, Beijing (CN); Hongping Zhang, Shanghai (CN); Bingzhao Li, Beijing (CN); Xun Tang, Beijing (CN); Jinhua Miao, Shenzhen (CN); Xiaodong Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 91 days.

(21) Appl. No.: 15/887,875

(22) Filed: Feb. 2, 2018

(65) Prior Publication Data

US 2018/0160467 A1    Jun. 7, 2018

Related U.S. Application Data

(63) Continuation of application No. PCT/CN2015/086009, filed on Aug. 4, 2015.

(51) Int. Cl.
*H04W 76/19* (2018.01)
*H04W 76/10* (2018.01)
(Continued)

(52) U.S. Cl.
CPC .......... *H04W 76/19* (2018.02); *H04W 12/06* (2013.01); *H04W 12/10* (2013.01); *H04W 76/10* (2018.02);
(Continued)

(58) Field of Classification Search
CPC ..... H04W 76/19; H04W 12/06; H04W 12/10; H04W 76/27; H04W 76/10; H04W 72/0406
See application file for complete search history.

(56) References Cited

U.S. PATENT DOCUMENTS

| 2011/0263221 A1* | 10/2011 | Yi | .......... H04L 1/0061 455/410 |
| 2012/0129499 A1* | 5/2012 | Li | .......... H04L 63/068 455/411 |

(Continued)

FOREIGN PATENT DOCUMENTS

| CN | 102595640 A | 7/2012 |
| CN | 103687053 A | 3/2014 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)"; 3GPP TS 36.331 V12.6.0; Jun. 2015; 449 pages.

(Continued)

*Primary Examiner* — Hashim S Bhatti
(74) *Attorney, Agent, or Firm* — Conley Rose, P.C.

(57) ABSTRACT

The present disclosure provides a communication method, a network-side device, and user equipment. The method includes: receiving, by a network-side device, a radio resource control RRC connection reestablishment request message, where the RRC connection reestablishment request message is used to request to perform RRC connection reestablishment; and sending, by the network-side device, an RRC connection reestablishment indication message, where the RRC connection reestablishment indication message carries a configuration parameter, and the configuration parameter includes at least one of a signaling radio (Continued)

bearer SRB2 configuration parameter or a data radio bearer DRB configuration parameter. The network-side device sends only the RRC connection reestablishment indication message, thereby effectively reducing a reestablishment delay and physical resource overheads.

16 Claims, 5 Drawing Sheets

(51) Int. Cl.
| | |
|---|---|
| H04W 76/27 | (2018.01) |
| H04W 12/06 | (2009.01) |
| H04W 12/10 | (2009.01) |
| H04W 72/04 | (2009.01) |

(52) U.S. Cl.
CPC ........ H04W 76/27 (2018.02); *H04W 72/0406* (2013.01)

(56) References Cited

U.S. PATENT DOCUMENTS

| | | | | |
|---|---|---|---|---|
| 2012/0315878 | A1* | 12/2012 | Deng | H04W 12/10 |
| | | | | 455/411 |
| 2013/0259003 | A1* | 10/2013 | Kwon | H04W 36/08 |
| | | | | 370/331 |
| 2013/0260811 | A1* | 10/2013 | Rayavarapu | H04W 76/19 |
| | | | | 455/509 |
| 2014/0287726 | A1* | 9/2014 | Jang | H04W 36/0083 |
| | | | | 455/411 |
| 2015/0181625 | A1 | 6/2015 | Uchino et al. | |
| 2017/0064762 | A1* | 3/2017 | Ramasamy | H04W 76/18 |

FOREIGN PATENT DOCUMENTS

| | | |
|---|---|---|
| CN | 104396337 A | 3/2015 |
| EP | 2688357 A1 | 1/2014 |
| WO | 2011120445 A1 | 10/2011 |

OTHER PUBLICATIONS

"3rd Generation Partnership Project; Technical Specification Group Services and System Aspects; 3GPP System Architecture Evolution (SAE); Security architecture (Release 12)"; 3GPP TS 33.401 V12.14.0; Mar. 2015; 131 pages.

* cited by examiner

COMMUNICATION METHOD, NETWORK-SIDE DEVICE, AND USER EQUIPMENT

CROSS-REFERENCE TO RELATED APPLICATIONS

This application is a continuation of International Application No. PCT/CN2015/086009, filed on Aug. 4, 2015, which is hereby incorporated by reference in its entirety.

TECHNICAL FIELD

The present disclosure relates to communications technologies, and in particular, to a communication method, a network-side device, and user equipment.

BACKGROUND

In a Long Term Evolution (LTE) network, a connection fault may occur on user equipment (UE) due to factors such as a radio environment or movement of the UE in a network coverage area. To ensure service continuity of the UE, the UE may initiate a radio resource control (RRC) connection reestablishment request to reestablish an RRC connection.

As shown in FIG. 1, FIG. 1 is a flowchart of an RRC connection reestablishment process in the prior art.

Step 101: UE sends an RRC connection reestablishment request message to a network-side device, where the message is used to request to perform RRC connection reestablishment.

Step 102: The network-side device sends an RRC connection reestablishment message to the UE, where the message carries a signaling radio bearer (SRB) 1 configuration parameter, a Medium Access Control (MAC) layer configuration parameter, a physical layer configuration parameter, and a link parameter nextHopChainingCount for updating a key by the user equipment.

Step 103: The UE sends an RRC connection reestablishment completion message to the network-side device.

Step 104: The network-side device sends an RRC connection reconfiguration message to the UE, where the message includes an SRB2 configuration parameter and a data radio bearer (DRB) configuration parameter.

Step 105: The UE sends an RRC connection reconfiguration completion message to the network-side device, to complete an RRC connection reestablishment process.

When RRC connection reestablishment is performed by using the method in the prior art, a reestablishment delay and physical resource overheads are relatively large.

SUMMARY

Embodiments of the present disclosure provide a communication method, a network-side device, and user equipment, so as to resolve a prior-art problem that a reestablishment delay and physical resource overheads are relatively large.

A first aspect of the present disclosure provides a communication method, including:
receiving, by a network-side device, a radio resource control RRC connection reestablishment request message, where the RRC connection reestablishment request message is used to request to perform RRC connection reestablishment; and
sending, by the network-side device, an RRC connection reestablishment indication message, where the RRC connection reestablishment indication message carries a configuration parameter, and the configuration parameter includes at least one of a signaling radio bearer SRB2 configuration parameter or a data radio bearer DRB configuration parameter.

With reference to the first aspect, in a first possible implementation of the first aspect, before the sending, by the network-side device, an RRC connection reestablishment indication message, the method further includes:
determining, by the network-side device, the RRC connection reestablishment indication message according to the RRC connection reestablishment request message.

With reference to the first aspect or the first possible implementation of the first aspect, in a second possible implementation of the first aspect, the sending, by the network-side device, an RRC connection reestablishment indication message further includes:
determining, by the network-side device, a first integrity authentication code according to at least one of a key, an integrity protection algorithm of a source serving cell, or the RRC connection reestablishment indication message, where the key is a key of the source serving cell or a key obtained according to a security parameter, and the security parameter is carried in the RRC connection reestablishment indication message, or the security parameter is carried in a packet data convergence protocol PDCP protocol data unit PDU corresponding to the RRC connection reestablishment indication message; and
adding, by the network-side device, the first integrity authentication code to the RRC connection reestablishment indication message or the PDCP PDU corresponding to the RRC connection reestablishment indication message.

With reference to any one of the first aspect or the first to the second possible implementations of the first aspect, in a third possible implementation of the first aspect, the sending, by the network-side device, an RRC connection reestablishment indication message includes:
encrypting, by the network-side device, the RRC connection reestablishment indication message according to an encryption algorithm of the source serving cell and the key of the source serving cell, to obtain an encrypted RRC connection reestablishment indication message; and
sending, by the network-side device, the encrypted RRC connection reestablishment indication message.

With reference to the second possible implementation of the first aspect, in a fourth possible implementation of the first aspect, the sending, by the network-side device, an RRC connection reestablishment indication message includes:
encrypting, by the network-side device, the configuration parameter according to an encryption algorithm of the source serving cell and the key obtained according to the security parameter, to obtain an encrypted configuration parameter; and
sending, by the network-side device, the security parameter and the encrypted configuration parameter.

With reference to the second possible implementation of the first aspect, in a fifth possible implementation of the first aspect, if the security parameter is carried in the PDCP PDU corresponding to the RRC connection reestablishment indication message, the sending, by the network-side device, an RRC connection reestablishment indication message includes:

encrypting, by the network-side device, the RRC connection reestablishment indication message according to an encryption algorithm of the source serving cell and the key obtained according to the security parameter, to obtain an encrypted RRC connection reestablishment indication message; and sending, by the network-side device, the encrypted RRC connection reestablishment indication message.

With reference to any one of the first aspect or the first to the fifth possible implementations of the first aspect, in a sixth possible implementation of the first aspect, the network-side device sends the RRC connection reestablishment indication message by using an SRB0 or an SRB1.

With reference to the sixth possible implementation of the first aspect, in a seventh possible implementation of the first aspect, if the network-side device sends the RRC connection reestablishment indication message by using the SRB1, before the receiving, by a network-side device, an RRC connection reestablishment request message, the method further includes:

sending, by the network-side device, a first SRB1 configuration parameter, where the first SRB1 configuration parameter is used to configure an SRB1 for transmitting the RRC connection reestablishment request message and/or an SRB1 for transmitting the RRC connection reestablishment indication message.

With reference to any one of the first aspect or the first to the seventh possible implementations of the first aspect, in an eighth possible implementation of the first aspect, after the sending, by the network-side device, an RRC connection reestablishment indication message, the method further includes:

receiving, by the network-side device, an RRC connection reestablishment completion message, where the RRC connection reestablishment completion message indicates that the RRC connection reestablishment is completed.

With reference to any one of the first aspect or the first to the seventh possible implementations of the first aspect, in a ninth possible implementation of the first aspect, the configuration parameter in the RRC connection reestablishment indication message further includes:

at least one of a second SRB1 configuration parameter, a Medium Access Control MAC layer configuration parameter, or a physical layer configuration parameter.

A second aspect of the present disclosure provides a communication method, including:

sending, by user equipment, a radio resource control RRC connection reestablishment request message, where the RRC connection reestablishment request message is used to request to perform RRC connection reestablishment;

receiving, by the user equipment, an RRC connection reestablishment indication message, where the RRC connection reestablishment indication message carries a configuration parameter, and the configuration parameter includes at least one of a signaling radio bearer SRB2 configuration parameter or a data radio bearer DRB configuration parameter; and configuring, by the user equipment, the RRC connection reestablishment indication message.

With reference to the second aspect, in a first possible implementation of the second aspect, before the configuring, by the user equipment, the RRC connection reestablishment indication message, the method further includes:

obtaining, by the user equipment, a first integrity authentication code, where the first integrity authentication code is carried in the RRC connection reestablishment indication message or a packet data convergence protocol PDCP protocol data unit PDU corresponding to the RRC connection reestablishment indication message;

determining, by the user equipment, a second integrity authentication code according to at least one of a key, an integrity protection algorithm of a source serving cell of the user equipment, or the RRC connection reestablishment indication message, where the key is a key of the source serving cell of the user equipment or a key obtained according to a security parameter, and the security parameter is carried in the RRC connection reestablishment indication message, or the security parameter is carried in the PDCP PDU corresponding to the RRC connection reestablishment indication message;

determining, by the user equipment, whether the second integrity authentication code is the same as the first integrity authentication code; and configuring, by the user equipment, the RRC connection reestablishment indication message when the second integrity authentication code is the same as the first integrity authentication code.

With reference to the second aspect, in a second possible implementation of the second aspect, if the RRC connection reestablishment indication message is an encrypted RRC connection reestablishment indication message, before the configuring, by the user equipment, the RRC connection reestablishment indication message, the method further includes:

decrypting, by the user equipment, the encrypted RRC connection reestablishment indication message according to a key of a source serving cell of the user equipment and a decryption algorithm corresponding to an encryption algorithm of the source serving cell, to obtain the RRC connection reestablishment indication message.

With reference to the first possible implementation of the second aspect, in a third possible implementation of the second aspect, if a configuration parameter in the RRC connection reestablishment indication message is an encrypted configuration parameter, before the configuring, by the user equipment, the RRC connection reestablishment indication message, the method further includes:

obtaining, by the user equipment, a first key according to the security parameter; and decrypting, by the user equipment, the encrypted configuration parameter according to the first key and a decryption algorithm corresponding to an encryption algorithm of the source serving cell of the user equipment, to obtain the configuration parameter.

With reference to the first possible implementation of the second aspect, in a fourth possible implementation of the second aspect, if the security parameter is carried in the PDCP PDU corresponding to the RRC connection reestablishment indication message, and the RRC connection reestablishment indication message is an encrypted RRC connection reestablishment indication message, before the configuring, by the user equipment, the RRC connection reestablishment indication message, the method further includes:

obtaining, by the user equipment, a second key according to the security parameter; and decrypting, by the user equipment, the encrypted RRC connection reestablishment indication message according to the second key and a decryption algorithm corresponding to an encryption algorithm of the source serving cell of the user equipment, to obtain the RRC connection reestablishment indication message.

With reference to any one of the second aspect or the first to the fourth possible implementations of the second aspect, in a fifth possible implementation of the second aspect, the user equipment sends the RRC connection reestablishment request message by using an SRB0 or an SRB1.

With reference to the fifth possible implementation of the second aspect, in a sixth possible implementation of the second aspect, if the user equipment sends the RRC connection reestablishment request message by using the SRB1, before the sending, by user equipment, an RRC connection reestablishment request message, the method further includes:

receiving, by the user equipment, a first SRB1 configuration parameter; and configuring, by the user equipment according to the first SRB1 configuration parameter, an SRB1 for transmitting the RRC connection reestablishment request message.

With reference to any one of the second aspect or the first to the sixth possible implementations of the second aspect, in a seventh possible implementation of the second aspect, after the configuring, by the user equipment, the RRC connection reestablishment indication message, the method further includes:

sending, by the user equipment, an RRC connection reestablishment completion message, where the RRC connection reestablishment completion message indicates that the RRC connection reestablishment is completed.

With reference to any one of the second aspect or the first to the sixth possible implementations of the second aspect, in an eighth possible implementation of the second aspect, the configuration parameter in the RRC connection reestablishment indication message further includes:

at least one of a second SRB1 configuration parameter, a Medium Access Control MAC layer configuration parameter, or a physical layer configuration parameter.

A third aspect of the present disclosure provides a network-side device, including:

a receiving module, configured to receive a radio resource control RRC connection reestablishment request message, where the RRC connection reestablishment request message is used to request to perform RRC connection reestablishment; and a sending module, configured to send an RRC connection reestablishment indication message, where the RRC connection reestablishment indication message carries a configuration parameter, and the configuration parameter includes at least one of a signaling radio bearer SRB2 configuration parameter or a data radio bearer DRB configuration parameter.

With reference to the third aspect, in a first possible implementation of the third aspect, the network-side device further includes: a processing module, configured to determine the RRC connection reestablishment indication message according to the RRC connection reestablishment request message.

With reference to the third aspect or the first possible implementation of the third aspect, in a second possible implementation of the third aspect, the processing module is further configured to:

determine a first integrity authentication code according to at least one of a key, an integrity protection algorithm of a source serving cell, or the RRC connection reestablishment indication message, where the key is a key of the source serving cell or a key obtained according to a security parameter, and the security parameter is carried in the RRC connection reestablishment indication message, or the security parameter is carried in a packet data convergence protocol PDCP protocol data unit PDU corresponding to the RRC connection reestablishment indication message; and add the first integrity authentication code to the RRC connection reestablishment indication message or the PDCP PDU corresponding to the RRC connection reestablishment indication message.

With reference to any one of the third aspect or the first to the second possible implementations of the third aspect, in a third possible implementation of the third aspect, the processing module is further configured to:

encrypt the RRC connection reestablishment indication message according to an encryption algorithm of the source serving cell and the key of the source serving cell, to obtain an encrypted RRC connection reestablishment indication message; and the sending module is configured to send the encrypted RRC connection reestablishment indication message.

With reference to the second possible implementation of the third aspect, in a fourth possible implementation of the third aspect, the processing module is further configured to:

encrypt the configuration parameter according to an encryption algorithm of the source serving cell and the key obtained according to the security parameter, to obtain an encrypted configuration parameter; and the sending module is configured to send the security parameter and the encrypted configuration parameter.

With reference to the second possible implementation of the third aspect, in a fifth possible implementation of the third aspect, if the security parameter is carried in the PDCP PDU corresponding to the RRC connection reestablishment indication message, the processing module is further configured to:

encrypt the RRC connection reestablishment indication message according to an encryption algorithm of the source serving cell and the key obtained according to the security parameter, to obtain an encrypted RRC connection reestablishment indication message; and the sending module is configured to send the encrypted RRC connection reestablishment indication message.

With reference to any one of the third aspect or the first to the fifth possible implementations of the third aspect, in a sixth possible implementation of the third aspect, the sending module sends the RRC connection reestablishment indication message by using an SRB0 or an SRB1.

With reference to the sixth possible implementation of the third aspect, in a seventh possible implementation of the third aspect, if the network-side device sends the RRC connection reestablishment indication message by using the SRB1, the sending module is further configured to send a first SRB1 configuration parameter before the receiving module receives the RRC connection reestablishment request message, where the first SRB1 configuration parameter is used to configure an SRB1 for transmitting the RRC connection reestablishment request message and/or an SRB1 for transmitting the RRC connection reestablishment indication message.

With reference to any one of the third aspect or the first to the seventh possible implementations of the third aspect, in an eighth possible implementation of the third aspect, the receiving module is further configured to receive an RRC connection reestablishment completion message after the sending module sends the RRC connection reestablishment indication message, where the RRC connection reestablishment completion message indicates that the RRC connection reestablishment is completed.

With reference to any one of the third aspect or the first to the seventh possible implementations of the third aspect, in a ninth possible implementation of the third aspect, the configuration parameter in the RRC connection reestablishment indication message further includes:
 at least one of a second SRB1 configuration parameter, a Medium Access Control MAC layer configuration parameter, or a physical layer configuration parameter.

A fourth aspect of the present disclosure provides user equipment, including:
 a sending module, configured to send a radio resource control RRC connection reestablishment request message, where the RRC connection reestablishment request message is used to request to perform RRC connection reestablishment;
 a receiving module, configured to receive an RRC connection reestablishment indication message, where the RRC connection reestablishment indication message carries a configuration parameter, and the configuration parameter includes at least one of a signaling radio bearer SRB2 configuration parameter or a data radio bearer DRB configuration parameter; and
 a processing module, for configuring the RRC connection reestablishment indication message.

With reference to the fourth aspect, in a first possible implementation of the fourth aspect, the receiving module is further configured to obtain a first integrity authentication code before the processing module configures the RRC connection reestablishment indication message, where the first integrity authentication code is carried in the RRC connection reestablishment indication message or a packet data convergence protocol PDCP protocol data unit PDU corresponding to the RRC connection reestablishment indication message;
 the processing module is further configured to determine a second integrity authentication code according to at least one of a key, an integrity protection algorithm of a source serving cell of the user equipment, or the RRC connection reestablishment indication message, where the key is a key of the source serving cell of the user equipment or a key obtained according to a security parameter, and the security parameter is carried in the RRC connection reestablishment indication message, or the security parameter is carried in the PDCP PDU corresponding to the RRC connection reestablishment indication message;
 the processing module is further configured to determine whether the second integrity authentication code is the same as the first integrity authentication code; and
 the processing module is for configuring the RRC connection reestablishment indication message when the second integrity authentication code is the same as the first integrity authentication code.

With reference to the fourth aspect, in a second possible implementation of the fourth aspect, if the RRC connection reestablishment indication message is an encrypted RRC connection reestablishment indication message, before configuring the RRC connection reestablishment indication message, the processing module is further configured to decrypt the encrypted RRC connection reestablishment indication message according to a key of a source serving cell of the user equipment and a decryption algorithm corresponding to an encryption algorithm of the source serving cell, to obtain the RRC connection reestablishment indication message.

With reference to the first possible implementation of the fourth aspect, in a third possible implementation of the fourth aspect, if a configuration parameter in the RRC connection reestablishment indication message is an encrypted configuration parameter, before configuring the RRC connection reestablishment indication message, the processing module is further configured to: obtain a first key according to the security parameter; and
 decrypt the encrypted configuration parameter according to the first key and a decryption algorithm corresponding to an encryption algorithm of the source serving cell of the user equipment, to obtain the configuration parameter.

With reference to the first possible implementation of the fourth aspect, in a fourth possible implementation of the fourth aspect, if the security parameter is carried in the PDCP PDU corresponding to the RRC connection reestablishment indication message, and the RRC connection reestablishment indication message is an encrypted RRC connection reestablishment indication message, before configuring the RRC connection reestablishment indication message, the processing module is further configured to: obtain a second key according to the security parameter; and
 decrypt the encrypted RRC connection reestablishment indication message according to the second key and a decryption algorithm corresponding to an encryption algorithm of the source serving cell of the user equipment, to obtain the RRC connection reestablishment indication message.

With reference to any one of the fourth aspect or the first to the fourth possible implementations of the fourth aspect, in a fifth possible implementation of the fourth aspect, the sending module sends the RRC connection reestablishment request message by using an SRB0 or an SRB1.

With reference to the fifth possible implementation of the fourth aspect, in a sixth possible implementation of the fourth aspect, if the user equipment sends the RRC connection reestablishment request message by using the SRB1, the receiving module is further configured to receive a first SRB1 configuration parameter before the sending module sends the RRC connection reestablishment request message; and
 the processing module is further for configuring, according to the first SRB1 configuration parameter, an SRB1 for transmitting the RRC connection reestablishment request message.

With reference to any one of the fourth aspect or the first to the sixth possible implementations of the fourth aspect, in a seventh possible implementation of the fourth aspect, the sending module is further configured to send an RRC connection reestablishment completion message after the processing module configures the RRC connection reestablishment indication message, where the RRC connection reestablishment completion message indicates that the RRC connection reestablishment is completed.

With reference to any one of the fourth aspect or the first to the sixth possible implementations of the fourth aspect, in an eighth possible implementation of the fourth aspect, the configuration parameter in the RRC connection reestablishment indication message further includes:
 at least one of a second SRB1 configuration parameter, a Medium Access Control MAC layer configuration parameter, or a physical layer configuration parameter.

A fifth aspect of the present disclosure provides a network-side device, including:
- a receiver, configured to receive a radio resource control RRC connection reestablishment request message, where the RRC connection reestablishment request message is used to request to perform RRC connection reestablishment; and
- a transmitter, configured to send an RRC connection reestablishment indication message, where the RRC connection reestablishment indication message carries a configuration parameter, and the configuration parameter includes at least one of a signaling radio bearer SRB2 configuration parameter or a data radio bearer DRB configuration parameter.

With reference to the fifth aspect, in a first possible implementation of the fifth aspect, the network-side device further includes: a processor, configured to determine the RRC connection reestablishment indication message according to the RRC connection reestablishment request message.

With reference to the fifth aspect or the first possible implementation of the fifth aspect, in a second possible implementation of the fifth aspect, the processor is further configured to:
- determine a first integrity authentication code according to at least one of a key, an integrity protection algorithm of a source serving cell, or the RRC connection reestablishment indication message, where the key is a key of the source serving cell or a key obtained according to a security parameter, and the security parameter is carried in the RRC connection reestablishment indication message, or the security parameter is carried in a packet data convergence protocol PDCP protocol data unit PDU corresponding to the RRC connection reestablishment indication message; and
- add the first integrity authentication code to the RRC connection reestablishment indication message or the PDCP PDU corresponding to the RRC connection reestablishment indication message.

With reference to any one of the fifth aspect or the first to the second possible implementations of the fifth aspect, in a third possible implementation of the fifth aspect, the processor is further configured to:
- encrypt the RRC connection reestablishment indication message according to an encryption algorithm of the source serving cell and the key of the source serving cell, to obtain an encrypted RRC connection reestablishment indication message; and
- the transmitter is configured to send the encrypted RRC connection reestablishment indication message.

With reference to the second possible implementation of the fifth aspect, in a fourth possible implementation of the fifth aspect, the processor is further configured to:
- encrypt the configuration parameter according to an encryption algorithm of the source serving cell and the key obtained according to the security parameter, to obtain an encrypted configuration parameter; and
- the transmitter is configured to send the security parameter and the encrypted configuration parameter.

With reference to the second possible implementation of the fifth aspect, in a fifth possible implementation of the fifth aspect, if the security parameter is carried in the PDCP PDU corresponding to the RRC connection reestablishment indication message, the processor is further configured to:
- encrypt the RRC connection reestablishment indication message according to an encryption algorithm of the source serving cell and the key obtained according to the security parameter, to obtain an encrypted RRC connection reestablishment indication message; and
- the transmitter is configured to send the encrypted RRC connection reestablishment indication message.

With reference to any one of the fifth aspect or the first to the fifth possible implementations of the fifth aspect, in a sixth possible implementation of the fifth aspect, the transmitter sends the RRC connection reestablishment indication message by using an SRB0 or an SRB1.

With reference to the sixth possible implementation of the fifth aspect, in a seventh possible implementation of the fifth aspect, if the network-side device sends the RRC connection reestablishment indication message by using the SRB1, the transmitter is further configured to send a first SRB1 configuration parameter before the receiver receives the RRC connection reestablishment request message, where the first SRB1 configuration parameter is used to configure an SRB1 for transmitting the RRC connection reestablishment request message and/or an SRB1 for transmitting the RRC connection reestablishment indication message.

With reference to any one of the fifth aspect or the first to the seventh possible implementations of the fifth aspect, in an eighth possible implementation of the fifth aspect, the receiver is further configured to receive an RRC connection reestablishment completion message after the transmitter sends the RRC connection reestablishment indication message, where the RRC connection reestablishment completion message indicates that the RRC connection reestablishment is completed.

With reference to any one of the fifth aspect or the first to the seventh possible implementations of the fifth aspect, in a ninth possible implementation of the fifth aspect, the configuration parameter in the RRC connection reestablishment indication message further includes:
- at least one of a second SRB1 configuration parameter, a Medium Access Control MAC layer configuration parameter, or a physical layer configuration parameter.

A sixth aspect of the present disclosure provides user equipment, including:
- a transmitter, configured to send a radio resource control RRC connection reestablishment request message, where the RRC connection reestablishment request message is used to request to perform RRC connection reestablishment;
- a receiver, configured to receive an RRC connection reestablishment indication message, where the RRC connection reestablishment indication message carries a configuration parameter, and the configuration parameter includes at least one of a signaling radio bearer SRB2 configuration parameter or a data radio bearer DRB configuration parameter; and
- a processor, for configuring the RRC connection reestablishment indication message.

With reference to the sixth aspect, in a first possible implementation of the sixth aspect, the receiver is further configured to obtain a first integrity authentication code before the processor configures the RRC connection reestablishment indication message, where the first integrity authentication code is carried in the RRC connection reestablishment indication message or a packet data convergence protocol PDCP protocol data unit PDU corresponding to the RRC connection reestablishment indication message;
the processor is further configured to determine a second integrity authentication code according to at least one of a key, an integrity protection algorithm of a source serving cell of the user equipment, or the RRC connection reestablishment indication message, where the key is a key of the source serving cell of the user equipment or a key obtained according to a security parameter, and the security parameter is carried in the RRC connection reestablishment indication message, or the security parameter is carried in the PDCP PDU corresponding to the RRC connection reestablishment indication message;

the processor is further configured to determine whether the second integrity authentication code is the same as the first integrity authentication code; and the processor is for configuring the RRC connection reestablishment indication message when the second integrity authentication code is the same as the first integrity authentication code.

With reference to the sixth aspect, in a second possible implementation of the sixth aspect, if the RRC connection reestablishment indication message is an encrypted RRC connection reestablishment indication message, before configuring the RRC connection reestablishment indication message, the processor is further configured to decrypt the encrypted RRC connection reestablishment indication message according to a key of a source serving cell of the user equipment and a decryption algorithm corresponding to an encryption algorithm of the source serving cell, to obtain the RRC connection reestablishment indication message.

With reference to the first possible implementation of the sixth aspect, in a third possible implementation of the sixth aspect, if a configuration parameter in the RRC connection reestablishment indication message is an encrypted configuration parameter, before configuring the RRC connection reestablishment indication message, the processor is further configured to: obtain a first key according to the security parameter; and decrypt the encrypted configuration parameter according to the first key and a decryption algorithm corresponding to an encryption algorithm of the source serving cell of the user equipment, to obtain the configuration parameter.

With reference to the first possible implementation of the sixth aspect, in a fourth possible implementation of the sixth aspect, if the security parameter is carried in the PDCP PDU corresponding to the RRC connection reestablishment indication message, and the RRC connection reestablishment indication message is an encrypted RRC connection reestablishment indication message, before configuring the RRC connection reestablishment indication message, the processor is further configured to: obtain a second key according to the security parameter; and decrypt the encrypted RRC connection reestablishment indication message according to the second key and a decryption algorithm corresponding to an encryption algorithm of the source serving cell of the user equipment, to obtain the RRC connection reestablishment indication message.

With reference to any one of the sixth aspect or the first to the fourth possible implementations of the sixth aspect, in a fifth possible implementation of the sixth aspect, the transmitter sends the RRC connection reestablishment request message by using an SRB0 or an SRB1.

With reference to the fifth possible implementation of the sixth aspect, in a sixth possible implementation of the sixth aspect, if the user equipment sends the RRC connection reestablishment request message by using the SRB1, the receiver is further configured to receive a first SRB1 configuration parameter before the transmitter sends the RRC connection reestablishment request message; and the processor is further for configuring, according to the first SRB1 configuration parameter, an SRB1 for transmitting the RRC connection reestablishment request message.

With reference to any one of the sixth aspect or the first to the sixth possible implementations of the sixth aspect, in a seventh possible implementation of the sixth aspect, the transmitter is further configured to send an RRC connection reestablishment completion message after the processor configures the RRC connection reestablishment indication message, where the RRC connection reestablishment completion message indicates that the RRC connection reestablishment is completed.

With reference to any one of the sixth aspect or the first to the sixth possible implementations of the sixth aspect, in an eighth possible implementation of the sixth aspect, the configuration parameter in the RRC connection reestablishment indication message further includes:

at least one of a second SRB1 configuration parameter, a Medium Access Control MAC layer configuration parameter, or a physical layer configuration parameter.

In the present disclosure, first, the network-side device receives the radio resource control RRC connection reestablishment request message, where the RRC connection reestablishment request message is used to request to perform RRC connection reestablishment; then, the network-side device sends the RRC connection reestablishment indication message, where the RRC connection reestablishment indication message carries the configuration parameter, and the configuration parameter includes the at least one of the signaling radio bearer SRB2 configuration parameter or the data radio bearer DRB configuration parameter. The network-side device sends only the RRC connection reestablishment indication message, thereby effectively reducing a reestablishment delay and physical resource overheads.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DETAILED DESCRIPTION

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

In LTE, an RRC connection fault may occur due to factors such as a radio environment or movement of UE in a network coverage area. To ensure service continuity of the UE, the UE may initiate an RRC connection reestablishment request to reestablish an RRC connection. According to a current protocol, the UE may initiate RRC reestablishment when a radio link failure (RLF), a handover failure, or an LTE to inter-RAT handover failure is detected, or an integrity protection check failure or an RRC reconfiguration failure is detected at a lower layer.

Figure 1:
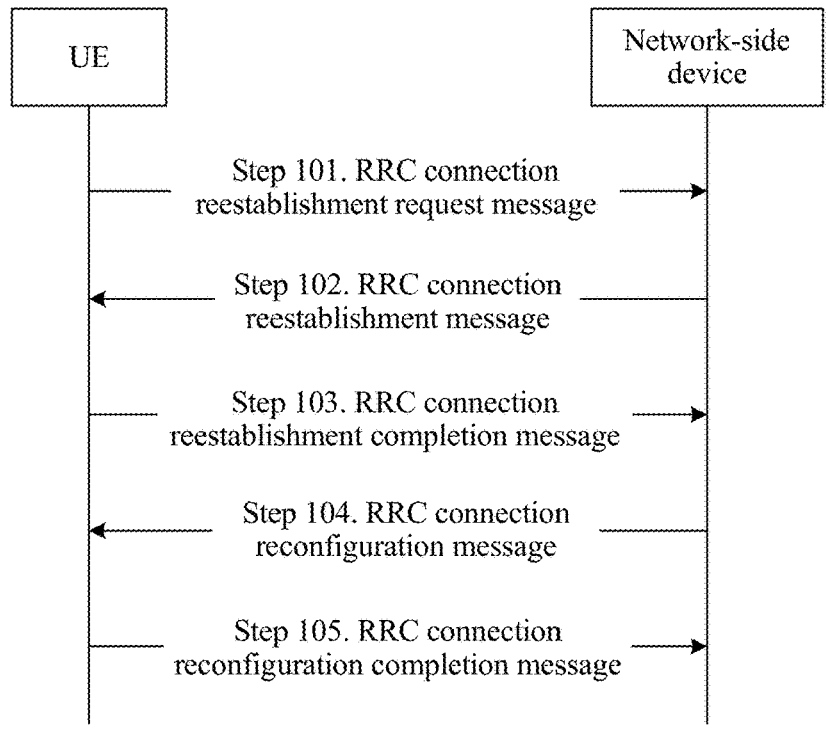
FIG. 1 is a flowchart of an RRC connection reestablishment process in the prior art.

Specifically, as shown in FIG. 1, FIG. 1 is a flowchart of an RRC connection reestablishment process in the prior art.

Step 101: UE sends an RRC connection reestablishment request message to a network-side device, where the message is used to request to perform RRC connection reestablishment.

The message carries at least one type of the following information: information about a serving cell (a source serving cell) in which the UE is located before the reestablishment, such as a cell radio network temporary identifier (C-RNTI) allocated by the source serving cell to the UE, a physical cell identifier (PCI) of the source serving cell, or 16 least significant bits (referred to as a short MAC-I) in an integrity authentication code (MAC-I) calculated by using a security parameter of the source serving cell; or an RRC connection reestablishment cause, such as a reconfiguration failure, a handover failure, or another failure cause.

The message is carried on a common control channel (CCCH), and a Radio Link Control (RLC) transmission mode corresponding to the common control channel is a transparent mode (TM). That is, at a transmit end, an RLC layer neither performs processing such as segmentation, tandem connection, or retransmission on the message nor encapsulates a protocol header of the RLC layer. Instead, the RLC layer merely sends the data to a lower layer such as a MAC layer for transmission. Correspondingly, at a receive end, the RLC layer directly sends, to an RRC layer without performing other processing, a message sent from the lower layer.

Step 102: The network-side device sends an RRC connection reestablishment message to the UE.

After receiving the RRC connection reestablishment request message sent by the UE, the network-side device queries, according to the C-RNTI and the PCI carried in the message, a corresponding shortMAC-I stored in the network-side device, and compares the queried shortMAC-I with the shortMAC-I carried in the RRC connection reestablishment request message, to determine whether the queried shortMAC-I is consistent with the carried shortMAC-I. If the queried shortMAC-I is consistent with the carried shortMAC-I, the network-side device accepts an RRC connection reestablishment request of the UE and sends the RRC connection reestablishment message to the UE; if the queried shortMAC-I is not consistent with the carried shortMAC-I, the network-side device rejects an RRC connection reestablishment request of the UE.

When the network-side device determines to accept the RRC connection reestablishment request of the UE, the network-side device determines a configuration parameter related to an SRB1, a MAC layer configuration parameter, and a physical layer configuration parameter that are corresponding to the UE, and a security parameter nextHopChainingCount for updating a key KeNB by the UE, adds these parameters to the RRC connection reestablishment message, and sends, to the UE, the RRC connection reestablishment message carrying these parameters.

Step 103: The UE sends an RRC connection reestablishment completion message to the network-side device.

After the UE receives the RRC connection reestablishment message sent by the network-side device, the UE applies the configuration parameter related to the SRB1, the MAC layer configuration parameter, and the physical layer configuration parameter to reestablish PDCP and RLC for the SRB1 and resume the SRB1. The UE stores the security parameter nextHopChainingCount, derives $K_{RRCint}$, $K_{RRCenc}$, and $K_{UPenc}$ according to the security parameter nextHopChainingCount, and configures the lower layer to immediately apply a previous encryption algorithm and the newly derived keys, where $K_{RRCint}$ is used for integrity protection of RRC signaling, $K_{RRCenc}$ is used to encrypt RRC signaling, and $K_{UPenc}$ is used to encrypt user data.

When the UE completes configuration of the RRC connection reestablishment message, the UE sends the RRC connection reestablishment completion message to the network-side device.

Step 104: The network-side device sends an RRC connection reconfiguration message to the UE.

The message includes a configuration parameter of an SRB2 and a configuration parameter of a DRB.

Step 105: The UE sends an RRC connection reconfiguration completion message to the network-side device, to complete an RRC connection reestablishment process.

After the UE receives the RRC connection reconfiguration message sent by the network-side device, the UE applies the configuration parameters related to the SRB2 and the DRB in the message and the previously received MAC layer configuration parameter and physical layer configuration parameter to reestablish PDCP and RLC for the SRB2 and the DRB and resume the SRB2 and the DRB.

When the UE completes configuration of parameters required by an RRC connection, the UE sends the RRC connection reconfiguration completion message to the network-side device, to complete the RRC connection reestablishment process.

However, when RRC connection reestablishment is performed in a manner in the prior art, a quantity of reestablishment signaling messages is relatively large, and a process is relatively complex, thereby resulting in a relatively large reestablishment delay. In addition, one piece of RRC signaling may be corresponding to an RLC layer message, a MAC layer message, and a physical layer message, and therefore, physical resource overheads are relatively large.

The inventor finds during research that, without affecting RRC reestablishment, a quantity of times of signaling interaction between the UE and the network-side device is reduced, so as to effectively reduce the reestablishment delay and the physical resource overheads.

The present disclosure may be applied to an LTE system, a Universal Mobile Telecommunications System (UMTS), and other wireless communications systems, and is applicable to a single-carrier scenario, a multi-carrier aggregation scenario, a relay scenario, a coordinated multipoint transmission/reception (CoMP) scenario, a dual-connection scenario, and the like. The network-side device in the present disclosure may be an evolved NodeB (eNB), a radio network controller (RNC), a base station NodeB, a cell, or the like.

Figure 2:
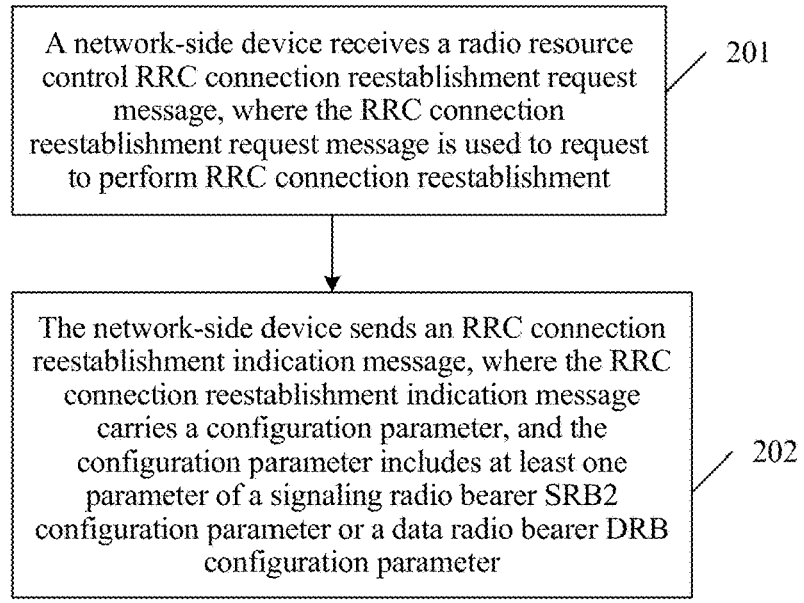
FIG. 2 is a flowchart of a communication method according to Embodiment 1 of the present disclosure.

FIG. 2 is a flowchart of a communication method according to Embodiment 1 of the present disclosure. As shown in FIG. 2, the method in this embodiment may include the following steps.

Step 201: A network-side device receives a radio resource control RRC connection reestablishment request message, where the RRC connection reestablishment request message is used to request to perform RRC connection reestablishment.

Specifically, the UE resumes an SRB1, an SRB2, and DRB in an RRC connection reestablishment process, so as to ensure that the UE continues to send and receive data, thereby ensuring service continuity.

The RRC connection reestablishment request message carries at least one type of the following information: information about a serving cell (a source serving cell) in which the UE is located before the reestablishment, such as a cell radio network temporary identifier (C-RNTI) allocated by the source serving cell to the UE, a physical cell identifier (PCI) of the source serving cell, or 16 least significant bits (referred to as a shortMAC-I) in an integrity authentication code (MAC-I) calculated by using a security parameter of the source serving cell; or an RRC connection reestablishment cause, such as a reconfiguration failure, a handover failure, or another failure cause.

Step 202: The network-side device sends an RRC connection reestablishment indication message, where the RRC connection reestablishment indication message carries a configuration parameter, and the configuration parameter includes at least one of a signaling radio bearer SRB2 configuration parameter or a data radio bearer DRB configuration parameter.

After receiving the RRC connection reestablishment request message sent by the UE, the network-side device obtains a UE context according to the C-RNTI and the PCI carried in the message.

Generally, the UE context contains UE capability information, and the network-side device learns, according to the UE context, that the UE is capable of optimizing the RRC reestablishment process, so as to perform subsequent optimization steps.

Alternatively, the UE adds specific instruction information to the RRC connection reestablishment request message, to instruct the UE to optimize the RRC reestablishment process.

Alternatively, the UE sets an LCID corresponding to the message to a special value, for example, 11111, so as to instruct the UE to optimize the RRC reestablishment process. Specifically, the UE sets the LCID to a reserved value in the prior art.

Specifically, in one case, the network-side device stores the UE context in advance. For example, the UE performs a handover before sending the RRC reestablishment request message. That is, the UE performs RRC connection reestablishment because of a handover failure. In this case, an original network-side device (or the source serving cell) adds the UE context to a handover preparation message, and sends, to a current network-side device (that is, a network-side device to which the UE initiates reestablishment) by using an X2 interface or by using an S1 interface and a mobility management entity (MME), the handover preparation message carrying the UE context. For another example, the original network-side device and the current network-side device are a same network-side device (the source serving cell is the same as or different from a current serving cell), that is, the network-side device stores the UE context.

The network-side device queries a corresponding shortMAC-I stored in the network-side device, and compares the queried shortMAC-I with the short MAC-I carried in the RRC connection reestablishment request message, to determine whether the queried shortMAC-I is consistent with the carried shortMAC-I. If the queried short MAC-I is consistent with the carried shortMAC-I, the network-side device accepts an RRC connection reestablishment request of the UE and sends an RRC connection reestablishment message to the UE; if the queried shortMAC-I is not consistent with the carried shortMAC-I, the network-side device rejects an RRC connection reestablishment request of the UE.

In another case, the network-side device does not store the UE context in advance. In this case, the network-side device requests the UE context from an original network-side device by using an X2 interface according to the C-RNTI information and the PCI information, such as an X2 interface message: an RLF indication or a UE context fetch request. The UE context carries at least the C-RNTI, the PCI, and the shortMAC-I of the source cell, and an evolved Universal Mobile Telecommunications System (UMTS) terrestrial radio access network (E-UTRAN) cell global identifier (ECGI) or a PCI of a current serving cell. Alternatively, the network-side device requests the UE context from the original network-side device by using an S1 interface and an MME. For example, a current network-side device sends an initial context request message or another S1 interface message to the MME. After receiving the S1 interface message, the MME determines the original network-side device according to at least one of the C-RNTI, the PCI, or the ECGI, and sends the S1 interface message to the original network-side device to request the UE context. Correspondingly, the original network-side device sends the UE context to the current network-side device by using the X2 interface or the S1 interface according to the information sent by the current network-side device. Optionally, before sending the UE context to the current network-side device by using the X2 interface or the S1 interface, the original network-side device further uses the security parameter of the source serving cell to calculate the integrity authentication code, compares the integrity authentication code with the received shortMAC-I for verification, and sends the UE context to the current network-side device only when the verification succeeds. Alternatively, the original network-side device sends both the calculated shortMAC-I and the UE context to the current network-side device, and the current network-side device performs verification.

Optionally, in the UE context sent by the original network-side device to the current network-side device, the security parameter used by the source serving cell may also be sent to the current network-side device, so that the current network-side device encrypts the RRC reestablishment request message and/or the RRC reestablishment indication message by using the security parameter of the source serving cell.

The UE may have established a plurality of DRBs before the reestablishment, for example, two or three DRBs, and configuration parameters corresponding to the DRBs are different. Therefore, during the reestablishment, a part or all of the plurality of DRBs may be reestablished.

It can be understood that, if the DRB configuration parameter and a previous configuration parameter do not need to be changed, content of the DRB configuration parameter may be simplified. For example, only instruction information for instructing to use a previous DRB configuration parameter needs to be carried. The instruction information may be for all DRBs of the UE, or each DRB is corresponding to one piece of instruction information, for example, instruction information for instructing to use the previous configuration parameter for a DRB1, or instruction information for instructing to use a new configuration parameter for a DRB2. Further, a method similar to that for the DRB configuration parameter may also be used for configuration parameters of the SRB1 and the SRB2, a MAC layer configuration parameter, and a PHY layer configuration parameter. Details are not described herein.

It can be understood that, the instruction information may also instruct to use all previous configuration parameters of the UE. This is not limited in the present disclosure.

According to the foregoing simplification, signaling overheads in the reestablishment process can be further reduced.

After receiving the RRC connection reestablishment request message, the network-side device determines the RRC connection reestablishment indication message according to the RRC connection reestablishment request message. The RRC connection reestablishment indication message may include a plurality of DRB configuration parameters.

In this embodiment, after receiving the RRC connection reestablishment request message, the network side needs to send only the RRC connection reestablishment indication message, and does not need to send another message, thereby effectively reducing signaling interaction in the RRC reestablishment process, and effectively reducing a reestablishment delay and physical resource overheads.

In this embodiment, first, the network-side device receives the radio resource control RRC connection reestablishment request message, where the RRC connection reestablishment request message is used to request to perform RRC connection reestablishment; then, the network-side device sends the RRC connection reestablishment indication message, where the RRC connection reestablishment indication message carries the configuration parameter, and the configuration parameter includes the at least one of the signaling radio bearer SRB2 configuration parameter or the data radio bearer DRB configuration parameter. The network-side device sends only the RRC connection reestablishment indication message, thereby effectively reducing a reestablishment delay and physical resource overheads.

Based on the foregoing embodiment, the configuration parameter in the RRC connection reestablishment indication message further includes at least one of a second SRB1 configuration parameter, a MAC layer configuration parameter, or a physical layer configuration parameter.

When the configuration parameter further includes the at least one of the second SRB1 configuration parameter, the MAC layer configuration parameter, or the physical layer configuration parameter, the RRC connection reestablishment indication message sent by the network-side device may be the RRC connection reestablishment message in step 102 and the RRC connection reconfiguration message in step 104. If the two messages are sent, the reestablishment delay and the physical resource overheads can be effectively reduced in comparison with the prior art, but an optimal effect cannot be produced. To further reduce the reestablishment delay and the physical resource overheads, the RRC connection reestablishment indication message sent by the network-side device may be a message obtained by combining the RRC connection reestablishment message in step 102 and the RRC connection reconfiguration message in step 104, and the message includes a configuration parameter in the RRC connection reestablishment message in step 102 and a configuration parameter in the RRC connection reconfiguration message in step 104; the RRC connection reestablishment indication message may be a message obtained by adding the configuration parameter included in the RRC connection reestablishment message in step 102 to the RRC connection reconfiguration message in step 104; or the RRC connection reestablishment indication message may be a message obtained by adding the configuration parameter included in the RRC connection reconfiguration message in step 104 to the RRC connection reestablishment message in step 102. A specific forming manner of the message is not limited in the present disclosure. In the foregoing manner, the reestablishment delay and the physical resource overheads can be further effectively reduced.

In actual application, in the RRC reestablishment process, integrity protection further needs to be performed to improve effectiveness of RRC reestablishment.

Specifically, first, after determining the RRC connection reestablishment indication message, the network-side device first determines a first integrity authentication code MAC-I according to at least one of a key, an integrity protection algorithm of a source serving cell, or the RRC connection reestablishment indication message, where the key is a key of the source serving cell or a key obtained according to a security parameter (nextHopChainingCount), and the security parameter is carried in the RRC connection reestablishment indication message, or the security parameter is carried in a packet data convergence protocol PDCP protocol data unit PDU corresponding to the RRC connection reestablishment indication message. The network-side device adds the first integrity authentication code to the RRC connection reestablishment indication message or the PDCP PDU corresponding to the RRC connection reestablishment indication message.

Herein, the source serving cell may be specifically a cell in which a radio link failure occurs on the UE, or a serving cell before the reestablishment.

The key obtained according to the security parameter (nextHopChainingCount) is the same as that in step 103.

A manner of obtaining the key according to the security parameter may be as follows: The UE uses one or more of the key of the source serving cell, the security parameter, or an identifier of a serving cell in which reestablishment is performed as input parameters for calculating a new key, and calculates the new key. A specific calculation method is not limited in the present disclosure.

Information in the integrity protection method is transparently transmitted, that is, the information is transmitted in plaintext. Therefore, the security parameter and the first integrity authentication code may be carried in the RRC connection reestablishment indication message or the PDCP PDU corresponding to the RRC connection reestablishment indication message for transmission.

According to the integrity protection method provided in this embodiment, integrity protection is performed to effectively improve integrity of the RRC connection reestablishment indication message and security of the RRC connection reestablishment process.

In step 201 and step 202, the RRC connection reestablishment request message and the RRC connection reestablishment indication message may be sent by using an SRB0, that is, the RRC connection reestablishment request message and the RRC connection reestablishment indication message in step 201 and step 202 may be carried on a common control channel (CCCH), and a Radio Link Control (RLC) transmission mode corresponding to the common control channel is a transparent mode (TM). That is, at a transmit end, an RLC layer neither performs processing such as segmentation, tandem connection, or retransmission on the message nor encapsulates a protocol header of the RLC layer. Instead, the RLC layer merely sends the data to a lower layer such as a MAC layer for transmission. Correspondingly, at a receive end, the RLC layer directly sends, to an RRC layer without performing other processing, a message sent from the lower layer.

In step 201 and step 202, the RRC connection reestablishment request message and the RRC connection reestablishment indication message may be sent by using an SRB1, that is, the RRC connection reestablishment request message and the RRC connection reestablishment indication message in step 201 and step 202 may be carried on a dedicated control channel (DCCH), and a Radio Link Control (RLC) transmission mode corresponding to the dedicated control channel is an acknowledged mode (AM). That is, at a transmit end, an RLC layer performs processing such as segmentation, tandem connection, or retransmission on the message, encapsulates a protocol header of the RLC layer, and then sends the processed data to a lower layer such as a MAC layer for transmission. When the RRC connection reestablishment request message and the RRC connection reestablishment indication message are sent by using the SRB1, the network-side device sends a first SRB1 configuration parameter. The first SRB1 configuration parameter is used to configure an SRB1 for transmitting the RRC connection reestablishment request message and/or an SRB1 for transmitting the RRC connection reestablishment indication message, and the first SRB1 configuration parameter includes:
  at least one of a packet data convergence protocol (PDCP) configuration parameter, a Radio Link Control (RLC) configuration parameter, or a Media Access Control (MAC) configuration parameter. A specific configuration parameter is similar to that in the prior art, and details are not described herein.

The first SRB1 configuration parameter is configured in advance to gain at least the following advantages:

Overheads of a reestablishment indication message can be reduced. For example, if the previous SRB1 configuration parameter may continue to be used, the SRB1 configuration parameter does not need to be carried in the reestablishment indication message.

Reliability of transmitting the SRB1 configuration parameter can be improved. Because the SRB1 configuration parameter is configured before the reestablishment, reliability is better. Reliability of a reestablishment-related message can be improved. Because transmission is performed by using the SRB1, retransmission may be performed at the RLC layer to ensure reliable transmission of a message.

Specifically, for a method for notifying the first SRB1 configuration parameter, refer to the description on the UE side.

Further, to avoid malicious obtaining of the message in a process of sending the RRC connection reestablishment indication message, the message may be encrypted to improve effectiveness of RRC reestablishment.

In a feasible encryption manner, it may be stipulated in a protocol that the RRC connection reestablishment indication message is encrypted by using an encryption algorithm of the source serving cell and the key of the source serving cell. Because a peer end requesting the network-side device to perform RRC connection reestablishment stores the key of the source serving cell, a specific implementation of the encryption manner is as follows:

The network-side device encrypts the RRC connection reestablishment indication message according to the encryption algorithm of the source serving cell and the key of the source serving cell, to obtain an encrypted RRC connection reestablishment indication message; then, the network-side device sends the encrypted RRC connection reestablishment indication message. The network-side device may send the encrypted RRC connection reestablishment indication message by using the SRB0 and the SRB1. In this case, the security parameter does not need to be transmitted in plaintext, thereby effectively improving reliability and effectiveness of RRC reestablishment.

In another feasible encryption manner, if the network-side device sends the RRC connection reestablishment indication message by using the SRB0 and encrypts the RRC connection reestablishment indication message by using an encryption algorithm of the source serving cell and the key obtained according to the security parameter, because a peer end requesting the network-side device to perform RRC connection reestablishment does not store the key obtained according to the security parameter, the network-side device needs to perform plaintext transmission (transparent transmission) on the security parameter. In this case, the network-side device encrypts the configuration parameter according to the encryption algorithm of the source serving cell and the key obtained according to the security parameter, to obtain an encrypted configuration parameter; then, the network-side device sends the security parameter and the encrypted configuration parameter. The RRC connection reestablishment indication message may be encrypted by using the key obtained according to the security parameter, thereby avoiding a security risk caused by leakage of the key of the source serving cell, and effectively improving reliability and effectiveness of RRC reestablishment.

In another feasible encryption manner, if the RRC connection reestablishment indication message is sent by using the SRB1 and the security parameter is carried in the PDCP PDU corresponding to the RRC connection reestablishment indication message, the RRC connection reestablishment indication message may be encrypted according to an encryption algorithm of the source serving cell and the key obtained according to the security parameter, to obtain an encrypted RRC connection reestablishment indication message. The network-side device sends the encrypted RRC connection reestablishment indication message. This avoids a security risk caused by leakage of the key of the source serving cell, and effectively improves reliability and effectiveness of RRC reestablishment.

After the network-side device sends the RRC connection reestablishment indication message, it may be considered by default that the peer end receiving the RRC connection reestablishment indication message completes the RRC connection reestablishment by using the message. To improve reliability and effectiveness of RRC reestablishment, after sending the RRC connection reestablishment indication message, the network-side device may further receive an RRC connection reestablishment completion message, and the RRC connection reestablishment completion message indicates that the RRC connection reestablishment is completed. The message is fed back, so that the network side learns that the RRC connection reestablishment is completed. This effectively improves reliability and effectiveness of RRC reestablishment.

It should be noted that, the network-side device may select one of the integrity protection method and the encryption method provided in this embodiment of the present disclosure, that is, only integrity protection may be performed on the RRC connection reestablishment indication message, or only encrypted protection may be performed on the RRC connection reestablishment indication message, or both integrity protection and encrypted protection are performed on the RRC connection reestablishment indication message. This is not limited in the present disclosure.

Figure 3:
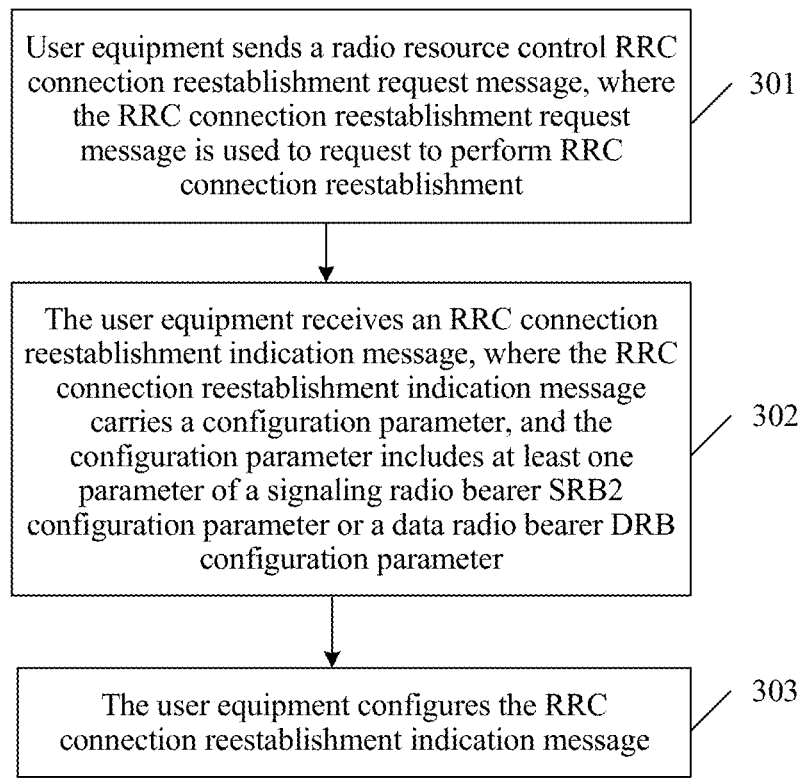
FIG. 3 is a flowchart of a communication method according to Embodiment 2 of the present disclosure.

FIG. 3 is a flowchart of a communication method according to Embodiment 2 of the present disclosure. As shown in FIG. 3, the method in this embodiment may include the following steps.

Step 301. User equipment sends a radio resource control RRC connection reestablishment request message, where the RRC connection reestablishment request message is used to request to perform RRC connection reestablishment.

Specifically, the UE resumes an SRB1, an SRB2, and an SRB2 in an RRC connection reestablishment process, so as to ensure that the UE continues to send and receive data, thereby ensuring service continuity.

The RRC connection reestablishment request message carries at least one type of the following information: information about a serving cell (a source serving cell) in which the UE is located before the reestablishment, such as a cell radio network temporary identifier (C-RNTI) allocated by the source serving cell to the UE, a physical cell identifier (PCI) of the source serving cell, or 16 least significant bits (referred to as a shortMAC-I) in an integrity authentication code (MAC-I) calculated by using a security parameter of the source serving cell; or an RRC connection reestablishment cause, such as a reconfiguration failure, a handover failure, or another failure cause.

Step 302: The user equipment receives an RRC connection reestablishment indication message, where the RRC connection reestablishment indication message carries a configuration parameter, and the configuration parameter includes at least one of a signaling radio bearer SRB2 configuration parameter or a data radio bearer DRB configuration parameter.

Step 303: The user equipment configures the RRC connection reestablishment indication message.

In this embodiment, the user equipment needs to send only the RRC connection reestablishment indication message, and does not need to send another message, thereby effectively reducing signaling interaction in the RRC connection reestablishment process, and effectively reducing a reestablishment delay and physical resource overheads.

In this embodiment, first, the user equipment sends the RRC connection reestablishment request message, where the RRC connection reestablishment request message is used to request to perform RRC connection reestablishment; then, the user equipment receives the RRC connection reestablishment indication message, where the RRC connection reestablishment indication message carries the configuration parameter, and the configuration parameter includes the at least one of the signaling radio bearer SRB2 configuration parameter or the data radio bearer DRB configuration parameter; finally, the user equipment configures the RRC connection reestablishment indication message. The user equipment sends only the RRC connection reestablishment request message, thereby effectively reducing a reestablishment delay and physical resource overheads.

In actual application, in the RRC reestablishment process, integrity protection is further performed to improve effectiveness of RRC reestablishment.

Specifically, after obtaining the RRC connection reestablishment indication message, the user equipment does not directly configure the configuration parameter in the RRC connection reestablishment indication message. Instead, the user equipment first obtains a first integrity authentication code, where the first integrity authentication code is carried in the RRC connection reestablishment indication message or a packet data convergence protocol PDCP protocol data unit PDU corresponding to the RRC connection reestablishment indication message; then, the user equipment determines a second integrity authentication code according to at least one of a key, an integrity protection algorithm of a source serving cell of the user equipment, or the RRC connection reestablishment indication message, where the key is a key of the source serving cell of the user equipment or a key obtained according to a security parameter, and the security parameter is carried in the RRC connection reestablishment indication message, or the security parameter is carried in the PDCP PDU corresponding to the RRC connection reestablishment indication message; further, the user equipment determines whether the second integrity authentication code is the same as the first integrity authentication code. If the second integrity authentication code is the same as the first integrity authentication code, the user equipment configures the RRC connection reestablishment indication message. If the second integrity authentication code is different from the first integrity authentication code, the UE discards the RRC connection reestablishment indication message, and does not configure the parameter in the RRC connection reestablishment indication message.

The key obtained according to the security parameter (nextHopChainingCount) is the same as that in step 103.

A manner of obtaining the key according to the security parameter may be as follows: The UE uses the key of the source serving cell, the security parameter, and an identifier of a serving cell in which reestablishment is performed as input parameters for calculating a new key, and calculates the new key.

According to the integrity protection method provided in this embodiment, integrity protection is performed to effectively improve integrity of the RRC connection reestablishment indication message and security of the RRC connection reestablishment process.

Further, to avoid a malicious attack on the message in a process of sending the RRC connection reestablishment indication message, the message may be encrypted to improve effectiveness of RRC reestablishment.

In a feasible manner, if the RRC connection reestablishment indication message is an encrypted RRC connection reestablishment indication message, before the user equipment configures the RRC connection reestablishment indication message, the method further includes: decrypting, by the user equipment, the encrypted RRC connection reestablishment indication message according to a key of a source serving cell of the user equipment and a decryption algorithm corresponding to an encryption algorithm of the source serving cell, to obtain the RRC connection reestablishment indication message. In this case, the security parameter does not need to be transmitted in plaintext, thereby improving reliability and effectiveness of RRC connection reestablishment.

In another feasible manner, if a configuration parameter in the RRC connection reestablishment indication message is an encrypted configuration parameter, the security parameter is transmitted in plaintext. Before the user equipment configures the RRC connection reestablishment indication message, the method further includes: obtaining, by the user equipment, a first key according to the security parameter; and decrypting, by the user equipment, the encrypted configuration parameter according to the first key and a decryption algorithm corresponding to an encryption algorithm of the source serving cell of the user equipment, to obtain the configuration parameter. The RRC connection reestablishment indication message may be encrypted by using the key obtained according to the security parameter, thereby avoiding a security risk caused by leakage of the key of the source serving cell, and effectively improving reliability and effectiveness of RRC reestablishment.

In another feasible manner, if the security parameter is carried in the PDCP PDU corresponding to the RRC connection reestablishment indication message, and the RRC connection reestablishment indication message is an encrypted RRC connection reestablishment indication message, before the user equipment configures the RRC connection reestablishment indication message, the method further includes: obtaining, by the user equipment, a second key according to the security parameter; and decrypting, by the user equipment, the encrypted RRC connection reestablishment indication message according to the second key and a decryption algorithm corresponding to an encryption algorithm of the source serving cell of the user equipment, to obtain the RRC connection reestablishment indication message. This avoids a security risk caused by leakage of the key of the source serving cell, and effectively improves reliability and effectiveness of RRC reestablishment.

In step 301, the user equipment may send the RRC connection reestablishment request message by using an SRB0 or an SRB1.

If the user equipment sends the RRC connection reestablishment request message by using the SRB1, before the user equipment sends the RRC connection reestablishment request message, the method further includes: receiving, by the user equipment, a first SRB1 configuration parameter; and configuring, by the user equipment according to the first SRB1 configuration parameter, an SRB1 for transmitting the RRC connection reestablishment request message. Optionally, the user equipment may obtain the first SRB1 configuration parameter according to a protocol; or the user equipment obtains the first SRB1 configuration parameter by using a system broadcast message; or the user equipment obtains the first SRB1 configuration parameter by using a first SRB1 configuration parameter obtained before the RRC reestablishment. A manner of obtaining the first SRB1 configuration parameter is not limited in the present disclosure.

The first SRB1 configuration parameter includes:
at least one of a packet data convergence protocol configuration parameter, a Radio Link Control configuration parameter, or a Media Access Control configuration parameter. A specific configuration parameter is similar to that in the prior art, and details are not described herein.

To improve reliability and effectiveness of RRC reestablishment, the user equipment further sends an RRC connection reestablishment completion message after configuring the RRC connection reestablishment indication message, where the RRC connection reestablishment completion message indicates that the RRC connection reestablishment is completed.

The RRC connection reestablishment completion message may be a newly-defined message, or may be the RRC connection reestablishment completion message in step 103 in the prior art or the RRC connection reconfiguration completion message in step 105 in the prior art. Alternatively, the RRC connection reestablishment completion message is the RRC connection reestablishment completion message in step 103 and the RRC connection reconfiguration message in step 105 in the prior art. A type of the message is not limited in the present disclosure.

Optionally, the configuration parameter in the RRC connection reestablishment indication message further includes at least one of a second SRB1 configuration parameter, a MAC layer configuration parameter, or a physical layer configuration parameter.

Figure 4:
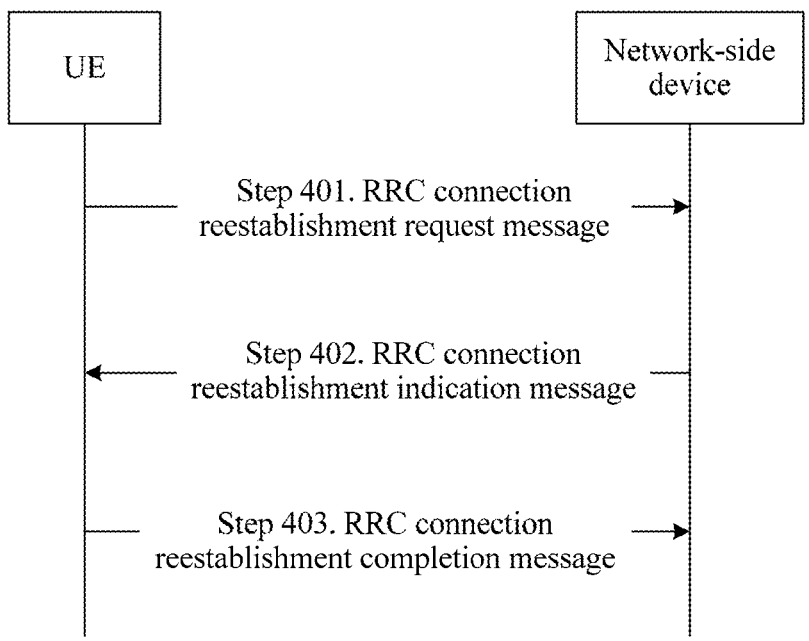
FIG. 4 is a flowchart of a communication method according to Embodiment 3 of the present disclosure.

FIG. 4 is a flowchart of a communication method according to Embodiment 3 of the present disclosure. As shown in FIG. 4, the method in this embodiment may include the following steps.

Step 401: UE sends an RRC connection reestablishment request message to a network side.

The message is transmitted on a CCCH in an RLC TM mode. That is, the message is carried by an SRB0.

An execution method of this step is similar to that of step 201 and step 301. For details, refer to the foregoing description. Details are not described herein again.

Step 402: The UE receives an RRC connection reestablishment indication message sent by the network-side device by using an SRB0.

An execution method of this step is similar to that of step 202 and step 302. For details, refer to the foregoing description.

The message is transmitted on the CCCH in an RLC TM mode. That is, the message is carried by the SRB0.

The message carries a security parameter nextHopChainingCount, and may further carry a configuration parameter of an SRB1, a configuration parameter of an SRB2, a configuration parameter of a DRB, a MAC layer configuration parameter, and a physical layer configuration parameter.

Optionally, integrity protection is performed on the message. Specifically, an integrity protection algorithm of a source serving cell and a KeNB of the source serving cell or a KeNB of a current serving cell are used to perform integrity protection on the message. In this case, the RRC message includes a MAC-I, and the MAC-I is a value calculated based on at least one of the KeNB of the source cell or the KeNB of the current cell, the integrity protection algorithm of the source cell, or content of the message.

Optionally, the message is encrypted. Specifically, the message is encrypted by using an encryption algorithm of a source serving cell and a key KeNB of a current serving cell. In this case, the security parameter nextHopChainingCount cannot be encrypted and needs to be transmitted in plaintext.

Optionally, encryption and integrity protection may be performed on the message. The parameter nextHopChainingCount is not encrypted. Optionally, integrity protection may be performed on both the security parameter nextHopChainingCount and the message, and the security parameter nextHopChainingCount includes a calculated MAC-I.

Messages are combined to reduce a delay and overheads. Integrity protection is introduced to improve security.

After the UE receives the message, the UE applies the configuration parameter of the SRB1, the configuration parameter of the SRB2, the configuration parameter of the DRB, the MAC layer configuration parameter, and the physical layer configuration parameter to verify security of the RRC connection reestablishment indication message, reestablish PDCP and RLC for the SRB1, the SRB2, and the DRB, and resume the SRB1, the SRB2, and the DRB.

Then, the UE stores a value of the nextHopChainingCount, derives $K_{RRCint}$, $K_{RRCenc}$, and $K_{UPenc}$ according to the value, and configures a lower layer to immediately apply a previous encryption algorithm and the newly derived $K_{RRCint}$, $K_{RRCenc}$, and $K_{UPenc}$. Finally, the UE resumes the SRB1, the SRB2, and the DRBs.

Step 403: The UE sends an RRC connection reestablishment completion message to the network-side device.

In this embodiment, the UE sends the RRC connection reestablishment request message to the network side by using the SRB0, and then receives the RRC connection reestablishment indication message sent by the network side by using the SRB0, and finally the UE sends the RRC connection reestablishment completion message to the network-side device. In this RRC reestablishment process, the network-side device sends only the RRC connection reestablishment indication message, thereby effectively reducing a reestablishment delay and physical resource overheads.

Figure 5:
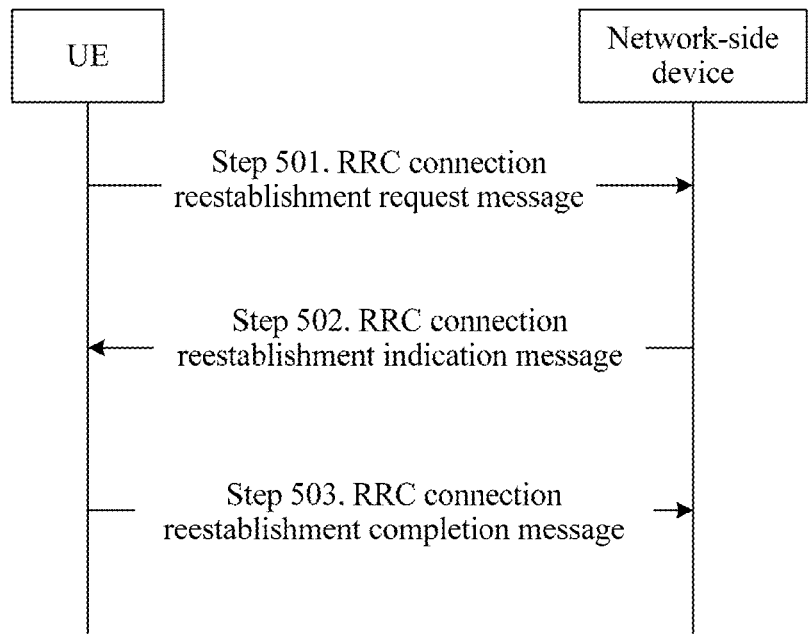
FIG. 5 is a flowchart of a communication method according to Embodiment 4 of the present disclosure.

FIG. 5 is a flowchart of a communication method according to Embodiment 4 of the present disclosure. As shown in FIG. 5, the method in this embodiment may include the following steps.

Step 501: UE sends an RRC connection reestablishment request message.

An execution method of this step is similar to that of step 201 and step 301. For details, refer to the foregoing description. Details are not described herein again.

The message is transmitted by using only an SRB1. A configuration parameter of the SRB1 may be obtained in the following manner:

The user equipment obtains the configuration parameter of the SRB1 according to a protocol; or the user equipment obtains the configuration parameter of the SRB1 by using a system broadcast message; or the user equipment obtains the configuration parameter of the SRB1 by using an SRB1 configuration parameter obtained before the RRC reestablishment; or the user equipment obtains the configuration parameter of the SRB1 by using an SRB1 configuration parameter that is obtained before the RRC reestablishment and that is used for the reestablishment.

The configuration parameter of the SRB1 includes:

at least one of a packet data convergence protocol configuration parameter, a Radio Link Control configuration parameter, or a Media Access Control configuration parameter. A specific configuration parameter is similar to that in the prior art, and details are not described herein.

Step 502: The UE receives an RRC connection reestablishment indication message sent by a network side by using an SRB0.

An execution method of this step is similar to that of step 202 and step 302. For details, refer to the foregoing description.

The message is transmitted on a DCCH in an RLC AM mode. That is, the message is carried by the SRB1. Because of AM RLC, operations such as segmentation, tandem connection, and ARQ retransmission may be performed on the RRC message, so as to improve channel adaptability and reliability.

The message carries a parameter nextHopChainingCount, and may further carry the configuration parameter of the SRB1, a configuration parameter of an SRB2, a configuration parameter of a DRB, a MAC layer configuration parameter, and a physical layer configuration parameter.

Optionally, integrity protection is performed on the message. Specifically, an integrity protection algorithm of a source serving cell, and a KeNB of the source serving cell or a KeNB of a current serving cell are used to perform integrity protection on the message. In this case, the RRC message includes a MAC-I or a PDCP layer includes the MAC-I, and the MAC-I is a value calculated based on at least one of the KeNB of the source cell or the KeNB of the cell, the integrity protection algorithm of the source cell, or content of the message. An integrity protection function may be implemented at an RRC layer or the PDCP layer.

Optionally, the message is encrypted. Specifically, the message is encrypted by using an encryption algorithm of a source serving cell and a KeNB of a current serving cell. An encryption function may be implemented at an RRC layer or a PDCP layer. In this case, the parameter nextHopChainingCount cannot be encrypted and needs to be transmitted in plaintext. Specifically, the parameter nextHopChainingCount may be transmitted in an RRC message in plaintext or transmitted at the PDCP layer in plaintext.

Optionally, encryption and integrity protection may be performed on the message. The parameter nextHopChainingCount is not encrypted and needs to be transmitted in plaintext. Specifically, the parameter nextHopChainingCount may be transmitted in an RRC message in plaintext or transmitted at a PDCP layer in plaintext. Optionally, integrity protection may be performed on both the parameter nextHopChainingCount and the message, and the parameter nextHopChainingCount includes a calculated MAC-I. Encryption and integrity protection may be implemented at an RRC layer or the PDCP layer.

Messages are combined to reduce a delay and overheads. Integrity protection is introduced to improve security.

The UE applies the configuration parameter of the SRB1, the configuration parameter of the SRB2, the configuration parameter of the DRB, the MAC layer configuration parameter, and the physical layer configuration parameter to verify security of the RRC connection reestablishment indication message, reestablish PDCP and RLC for the SRB1, the SRB2, and the DRB, and resume the SRB1, the SRB2, and the DRB.

Then, the UE stores a value of the nextHopChainingCount, derives $K_{RRCint}$, $K_{RRCenc}$, and $K_{UPenc}$ according to the value, and configures a lower layer to immediately apply a previous encryption algorithm and the newly derived $K_{RRCint}$, $K_{RRCenc}$, and $K_{UPenc}$. Finally, the UE resumes the SRB1, the SRB2, and the DRBs.

For a subsequent RRC message, the newly derived $K_{RRCint}$, $K_{RRCenc}$, and $K_{UPenc}$ are used to perform integrity protection and encryption.

Step 503: The UE sends an RRC connection reestablishment completion message to the network-side device.

In this embodiment, the UE sends the RRC connection reestablishment request message to the network side by using the SRB1, and then receives the RRC connection reestablishment indication message sent by the network side by using the SRB1, and finally the UE sends the RRC connection reestablishment completion message to the network-side device. In this RRC reestablishment process, the network-side device sends only the RRC connection reestablishment indication message, thereby effectively reducing a reestablishment delay and physical resource overheads.

Figure 6:
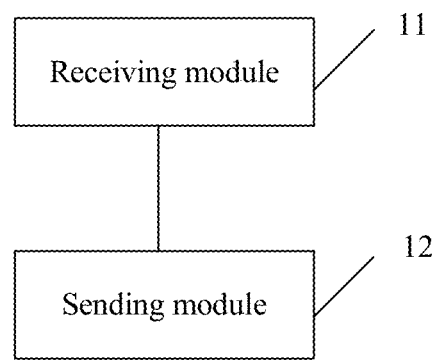
FIG. 6 is a schematic structural diagram of a network-side device according to Embodiment 1 of the present disclosure.

FIG. 6 is a schematic structural diagram of a network-side device according to Embodiment 1 of the present disclosure. As shown in FIG. 6, the apparatus in this embodiment may include a receiving module 11 and a sending module 12. The receiving module 11 is configured to receive a radio resource control RRC connection reestablishment request message, where the RRC connection reestablishment request message is used to request to perform RRC connection reestablishment.

The sending module 12 is configured to send an RRC connection reestablishment indication message, where the RRC connection reestablishment indication message carries a configuration parameter, and the configuration parameter includes at least one of a signaling radio bearer SRB2 configuration parameter or a data radio bearer DRB configuration parameter.

Figure 7:
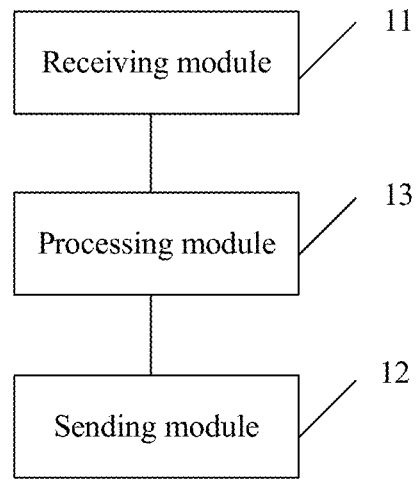
FIG. 7 is a schematic structural diagram of a network-side device according to Embodiment 2 of the present disclosure.

Further, FIG. 7 is a schematic structural diagram of a network-side device according to Embodiment 2 of the present disclosure. As shown in FIG. 7, the network-side device shown in FIG. 6 further includes: a processing module 13, configured to determine the RRC connection reestablishment indication message according to the RRC connection reestablishment request message.

Optionally, the processing module 13 is further configured to:
  determine a first integrity authentication code according to at least one of a key, an integrity protection algorithm of a source serving cell, or the RRC connection reestablishment indication message, where the key is a key of the source serving cell or a key obtained according to a security parameter, and the security parameter is carried in the RRC connection reestablishment indication message, or the security parameter is carried in a packet data convergence protocol PDCP protocol data unit PDU corresponding to the RRC connection reestablishment indication message; and
  add the first integrity authentication code to the RRC connection reestablishment indication message or the PDCP PDU corresponding to the RRC connection reestablishment indication message.

Optionally, the processing module 13 is further configured to:
  encrypt the RRC connection reestablishment indication message according to an encryption algorithm of the source serving cell and the key of the source serving cell, to obtain an encrypted RRC connection reestablishment indication message.

The sending module 12 is configured to send the encrypted RRC connection reestablishment indication message.

Optionally, the processing module 13 is further configured to:
  encrypt the configuration parameter according to an encryption algorithm of the source serving cell and the key obtained according to the security parameter, to obtain an encrypted configuration parameter.

The sending module 12 is configured to send the security parameter and the encrypted configuration parameter.

Optionally, if the security parameter is carried in the PDCP PDU corresponding to the RRC connection reestablishment indication message, the processing module 13 is further configured to:
  encrypt the RRC connection reestablishment indication message according to an encryption algorithm of the source serving cell and the key obtained according to the security parameter, to obtain an encrypted RRC connection reestablishment indication message.

The sending module 12 is configured to send the encrypted RRC connection reestablishment indication message.

Optionally, the sending module 12 sends the RRC connection reestablishment indication message by using an SRB0 or an SRB1.

Optionally, if the network-side device sends the RRC connection reestablishment indication message by using the SRB1, the sending module 12 is further configured to send a first SRB1 configuration parameter before the receiving module 11 receives the RRC connection reestablishment request message, where the first SRB1 configuration parameter is used to configure an SRB1 for transmitting the RRC connection reestablishment request message and/or an SRB1 for transmitting the RRC connection reestablishment indication message.

Optionally, the receiving module 11 is further configured to receive an RRC connection reestablishment completion message after the sending module 12 sends the RRC connection reestablishment indication message, where the RRC connection reestablishment completion message indicates that the RRC connection reestablishment is completed.

Optionally, the configuration parameter in the RRC connection reestablishment indication message further includes:
  at least one of a second SRB1 configuration parameter, a MAC layer configuration parameter, or a physical layer configuration parameter.

The apparatus in this embodiment may be configured to execute the technical solution in the method embodiment shown in FIG. 2. An implementation principle and a technical effect of the apparatus are similar to those of the method embodiment, and details are not described herein again.

Figure 8:
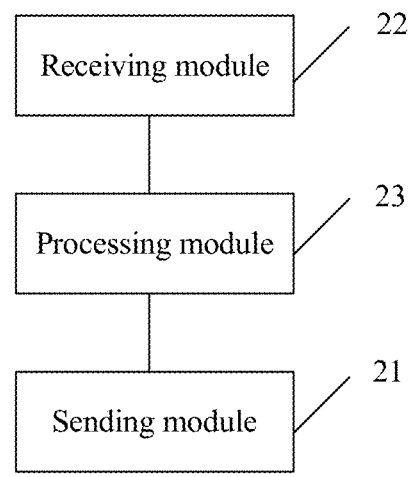
FIG. 8 is a schematic structural diagram of user equipment according to Embodiment 1 of the present disclosure.

FIG. 8 is a schematic structural diagram of user equipment according to Embodiment 1 of the present disclosure. As shown in FIG. 8, the user equipment includes:
  a sending module 21, configured to send a radio resource control RRC connection reestablishment request message, where the RRC connection reestablishment request message is used to request to perform RRC connection reestablishment;
  a receiving module 22, configured to receive an RRC connection reestablishment indication message, where the RRC connection reestablishment indication message carries a configuration parameter, and the configuration parameter includes at least one of a signaling radio bearer SRB2 configuration parameter or a data radio bearer DRB configuration parameter; and
  a processing module 23, for configuring the RRC connection reestablishment indication message.

Optionally, the receiving module 22 is further configured to obtain a first integrity authentication code before the processing module 23 configures the RRC connection reestablishment indication message, where the first integrity authentication code is carried in the RRC connection reestablishment indication message or a packet data convergence protocol PDCP protocol data unit PDU corresponding to the RRC connection reestablishment indication message.

The processing module 23 is further configured to determine a second integrity authentication code according to at least one of a key, an integrity protection algorithm of a source serving cell of the user equipment, or the RRC connection reestablishment indication message, where the key is a key of the source serving cell of the user equipment or a key obtained according to a security parameter, and the security parameter is carried in the RRC connection reestablishment indication message, or the security parameter is carried in the PDCP PDU corresponding to the RRC connection reestablishment indication message.

The processing module 23 is further configured to determine whether the second integrity authentication code is the same as the first integrity authentication code.

The processing module 23 is for configuring the RRC connection reestablishment indication message when the second integrity authentication code is the same as the first integrity authentication code.

Optionally, if the RRC connection reestablishment indication message is an encrypted RRC connection reestablishment indication message, before configuring the RRC connection reestablishment indication message, the processing module 23 is further configured to decrypt the encrypted RRC connection reestablishment indication message according to a key of a source serving cell of the user equipment and a decryption algorithm corresponding to an encryption algorithm of the source serving cell, to obtain the RRC connection reestablishment indication message.

Optionally, if a configuration parameter in the RRC connection reestablishment indication message is an encrypted configuration parameter, before configuring the RRC connection reestablishment indication message, the processing module 23 is further configured to: obtain a first key according to the security parameter; and decrypt the encrypted configuration parameter according to the first key and a decryption algorithm corresponding to an encryption algorithm of the source serving cell of the user equipment, to obtain the configuration parameter.

Optionally, if the security parameter is carried in the PDCP PDU corresponding to the RRC connection reestablishment indication message, and the RRC connection reestablishment indication message is an encrypted RRC connection reestablishment indication message, before configuring the RRC connection reestablishment indication message, the processing module 23 is further configured to: obtain a second key according to the security parameter; and decrypt the encrypted RRC connection reestablishment indication message according to the second key and a decryption algorithm corresponding to an encryption algorithm of the source serving cell of the user equipment, to obtain the RRC connection reestablishment indication message.

Optionally, the sending module 21 sends the RRC connection reestablishment request message by using an SRB0 or an SRB1.

Optionally, if the user equipment sends the RRC connection reestablishment request message by using the SRB1, the receiving module 22 is further configured to receive a first SRB1 configuration parameter before the sending module 21 sends the RRC connection reestablishment request message.

The processing module 23 is further for configuring, according to the first SRB1 configuration parameter, an SRB1 for transmitting the RRC connection reestablishment request message.

Optionally, the sending module 21 is further configured to send an RRC connection reestablishment completion message after the processing module 23 configures the RRC connection reestablishment indication message, where the RRC connection reestablishment completion message indicates that the RRC connection reestablishment is completed.

Optionally, the configuration parameter in the RRC connection reestablishment indication message further includes:

at least one of a second SRB1 configuration parameter, a MAC layer configuration parameter, or a physical layer configuration parameter.

The apparatus in this embodiment may be configured to execute the technical solution in the method embodiment shown in FIG. 3. An implementation principle and a technical effect of the apparatus are similar to those of the method embodiment, and details are not described herein again.

Figure 9:
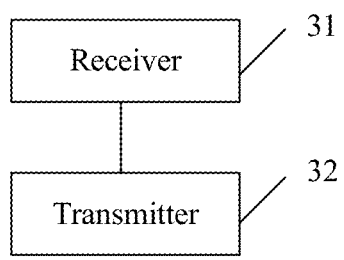
FIG. 9 is a schematic structural diagram of a network-side device according to Embodiment 3 of the present disclosure.

FIG. 9 is a schematic structural diagram of a network-side device according to Embodiment 3 of the present disclosure. As shown in FIG. 9, the network-side device includes:

a receiver 31, configured to receive a radio resource control RRC connection reestablishment request message, where the RRC connection reestablishment request message is used to request to perform RRC connection reestablishment; and a transmitter 32, configured to send an RRC connection reestablishment indication message, where the RRC connection reestablishment indication message carries a configuration parameter, and the configuration parameter includes at least one of a signaling radio bearer SRB2 configuration parameter or a data radio bearer DRB configuration parameter.

Figure 10:
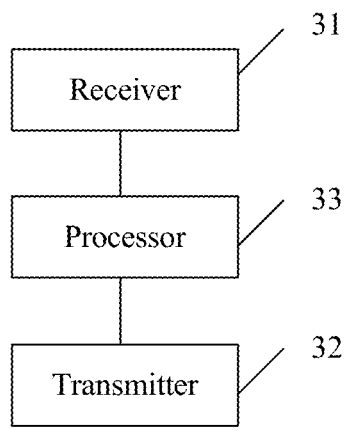
FIG. 10 is a schematic structural diagram of a network-side device according to Embodiment 4 of the present disclosure.

Further, as shown in FIG. 10, the network-side device shown in FIG. 9 further includes: a processor 33, configured to determine the RRC connection reestablishment indication message according to the RRC connection reestablishment request message.

Optionally, the processor 33 is further configured to:

determine a first integrity authentication code according to at least one of a key, an integrity protection algorithm of a source serving cell, or the RRC connection reestablishment indication message, where the key is a key of the source serving cell or a key obtained according to a security parameter, and the security parameter is carried in the RRC connection reestablishment indication message, or the security parameter is carried in a packet data convergence protocol PDCP protocol data unit PDU corresponding to the RRC connection reestablishment indication message; and add the first integrity authentication code to the RRC connection reestablishment indication message or the PDCP PDU corresponding to the RRC connection reestablishment indication message.

Optionally, the processor 33 is further configured to:

encrypt the RRC connection reestablishment indication message according to an encryption algorithm of the source serving cell and the key of the source serving cell, to obtain an encrypted RRC connection reestablishment indication message.

The transmitter 32 is configured to send the encrypted RRC connection reestablishment indication message.

Optionally, the processor 33 is further configured to:

encrypt the configuration parameter according to an encryption algorithm of the source serving cell and the key obtained according to the security parameter, to obtain an encrypted configuration parameter.

The transmitter 32 is configured to send the security parameter and the encrypted configuration parameter.

Optionally, if the security parameter is carried in the PDCP PDU corresponding to the RRC connection reestablishment indication message, the processor 33 is further configured to:

encrypt the RRC connection reestablishment indication message according to an encryption algorithm of the source serving cell and the key obtained according to the security parameter, to obtain an encrypted RRC connection reestablishment indication message.

The transmitter 32 is configured to send the encrypted RRC connection reestablishment indication message.

Optionally, the transmitter 32 sends the RRC connection reestablishment indication message by using an SRB0 or an SRB1.

Optionally, if the network-side device sends the RRC connection reestablishment indication message by using the SRB1, the transmitter 32 is further configured to send a first SRB1 configuration parameter before the receiver 31 receives the RRC connection reestablishment request message, where the first SRB1 configuration parameter is used to configure an SRB1 for transmitting the RRC connection reestablishment request message and/or an SRB1 for transmitting the RRC connection reestablishment indication message.

Optionally, the receiver 31 is further configured to receive an RRC connection reestablishment completion message after the transmitter 32 sends the RRC connection reestablishment indication message, where the RRC connection reestablishment completion message indicates that the RRC connection reestablishment is completed.

Optionally, the configuration parameter in the RRC connection reestablishment indication message further includes:
at least one of a second SRB1 configuration parameter, a MAC layer configuration parameter, or a physical layer configuration parameter.

The apparatus in this embodiment may be configured to execute the technical solution in the method embodiment shown in FIG. 2. An implementation principle and a technical effect of the apparatus are similar to those of the method embodiment, and details are not described herein again.

Figure 11:
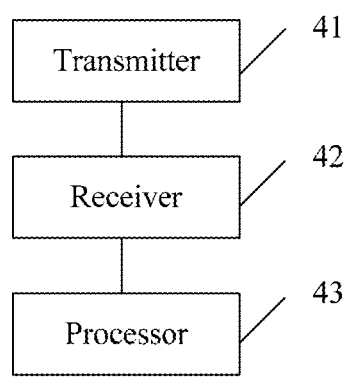
FIG. 11 is a schematic structural diagram of user equipment according to Embodiment 2 of the present disclosure.

FIG. 11 is a schematic structural diagram of user equipment according to Embodiment 2 of the present disclosure. As shown in FIG. 11, the user equipment includes:
a transmitter 41, configured to send a radio resource control RRC connection reestablishment request message, where the RRC connection reestablishment request message is used to request to perform RRC connection reestablishment;
a receiver 42, configured to receive an RRC connection reestablishment indication message, where the RRC connection reestablishment indication message carries a configuration parameter, and the configuration parameter includes at least one of a signaling radio bearer SRB2 configuration parameter or a data radio bearer DRB configuration parameter; and
a processor 43, for configuring the RRC connection reestablishment indication message.

Optionally, the receiver 42 is further configured to obtain a first integrity authentication code before the processor 43 configures the RRC connection reestablishment indication message, where the first integrity authentication code is carried in the RRC connection reestablishment indication message or a packet data convergence protocol PDCP protocol data unit PDU corresponding to the RRC connection reestablishment indication message.

The processor 43 is further configured to determine a second integrity authentication code according to at least one of a key, an integrity protection algorithm of a source serving cell of the user equipment, or the RRC connection reestablishment indication message, where the key is a key of the source serving cell of the user equipment or a key obtained according to a security parameter, and the security parameter is carried in the RRC connection reestablishment indication message, or the security parameter is carried in the PDCP PDU corresponding to the RRC connection reestablishment indication message.

The processor 43 is further configured to determine whether the second integrity authentication code is the same as the first integrity authentication code.

The processor 43 is for configuring the RRC connection reestablishment indication message when the second integrity authentication code is the same as the first integrity authentication code.

Optionally, if the RRC connection reestablishment indication message is an encrypted RRC connection reestablishment indication message, before configuring the RRC connection reestablishment indication message, the processor 43 is further configured to decrypt the encrypted RRC connection reestablishment indication message according to a key of a source serving cell of the user equipment and a decryption algorithm corresponding to an encryption algorithm of the source serving cell, to obtain the RRC connection reestablishment indication message.

Optionally, if a configuration parameter in the RRC connection reestablishment indication message is an encrypted configuration parameter, before configuring the RRC connection reestablishment indication message, the processor 43 is further configured to: obtain a first key according to the security parameter; and
decrypt the encrypted configuration parameter according to the first key and a decryption algorithm corresponding to an encryption algorithm of the source serving cell of the user equipment, to obtain the configuration parameter.

Optionally, if the security parameter is carried in the PDCP PDU corresponding to the RRC connection reestablishment indication message, and the RRC connection reestablishment indication message is an encrypted RRC connection reestablishment indication message, before configuring the RRC connection reestablishment indication message, the processor 43 is further configured to: obtain a second key according to the security parameter; and
decrypt the encrypted RRC connection reestablishment indication message according to the second key and a decryption algorithm corresponding to an encryption algorithm of the source serving cell of the user equipment, to obtain the RRC connection reestablishment indication message.

Optionally, the transmitter 41 sends the RRC connection reestablishment request message by using an SRB0 or an SRB1.

Optionally, if the user equipment sends the RRC connection reestablishment request message by using the SRB1, the receiver 42 is further configured to receive a first SRB1 configuration parameter before the transmitter 41 sends the RRC connection reestablishment request message.

The processor 43 is further for configuring, according to the first SRB1 configuration parameter, an SRB1 for transmitting the RRC connection reestablishment request message.

Optionally, the transmitter 41 is further configured to send an RRC connection reestablishment completion message after the processor 43 configures the RRC connection reestablishment indication message, where the RRC connection reestablishment completion message indicates that the RRC connection reestablishment is completed.

Optionally, the configuration parameter in the RRC connection reestablishment indication message further includes:
at least one of a second SRB1 configuration parameter, a MAC layer configuration parameter, or a physical layer configuration parameter.

The apparatus in this embodiment may be configured to execute the technical solution in the method embodiment shown in FIG. 3. An implementation principle and a technical effect of the apparatus are similar to those of the method embodiment, and details are not described herein again.

Figure 12:
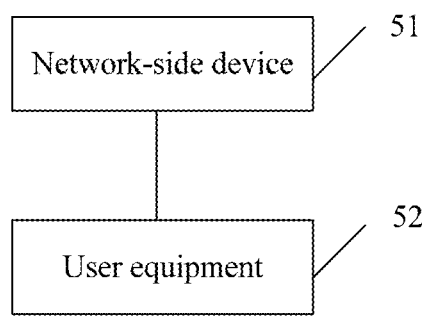
FIG. 12 is a schematic structural diagram of a communications system according to an embodiment of the present disclosure.

FIG. 12 is a schematic structural diagram of a communications system according to an embodiment of the present disclosure. As shown in FIG. 12, the system in this embodiment includes a network-side device 51 and user equipment 52. The network-side device 51 may use the structure of the apparatus embodiment in either FIG. 6 or FIG. 7, and may correspondingly execute the technical solution in the method embodiment in FIG. 2. The user equipment 52 may use the structure of the apparatus embodiment in FIG. 8, and may correspondingly execute the technical solution in the method embodiment in FIG. 3. An implementation principle and a technical effect of the communications system are similar to those of the method embodiment, and details are not described herein again.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A communication method, comprising:
sending, by communication device, a radio resource control (RRC) connection reestablishment request message for request to perform RRC connection reestablishment;
receiving, by the communication device, an RRC connection reestablishment indication message carrying a configuration parameter comprising at least one of a signaling radio bearer 2 (SRB2) configuration parameter or a data radio bearer (DRB) configuration parameter;
obtaining, by the communication device, a first integrity authentication code carried in the RRC connection reestablishment indication message or a packet data convergence protocol (PDCP) protocol data unit (PDU) corresponding to the RRC connection reestablishment indication message;
determining, by the communication device, a second integrity authentication code according to at least one of a key, an integrity protection algorithm of a source serving cell of the communication device, or the RRC connection reestablishment indication message, wherein the key is a key of the source serving cell of the communication device or a key obtained according to a security parameter, and the security parameter is carried in the RRC connection reestablishment indication message, or the security parameter is carried in the PDCP PDU corresponding to the RRC connection reestablishment indication message;
determining, by the communication device, whether the second integrity authentication code is the same as the first integrity authentication code; and
configuring, by the communication device, the RRC connection reestablishment indication message when the second integrity authentication code is the same as the first integrity authentication code.

2. The method according to claim 1, wherein when a configuration parameter in the RRC connection reestablishment indication message is an encrypted configuration parameter, before configuring, by the communication device, the RRC connection reestablishment indication message, the method further comprises:
obtaining, by the communication device, a first key according to the security parameter; and
decrypting, by the communication device, the encrypted configuration parameter according to the first key and a decryption algorithm corresponding to an encryption algorithm of the source serving cell of the communication device, to obtain the configuration parameter.

3. The method according to claim 1, wherein the communication device sends the RRC connection reestablishment request message by using an SRB0 or an SRB1.

4. The method according to claim 3, wherein when the communication device sends the RRC connection reestablishment request message by using the SRB1, before sending, by communication device, an RRC connection reestablishment request message, the method further comprises:
receiving, by the communication device, a first SRB1 configuration parameter; and
configuring, by the communication device according to the first SRB1 configuration parameter, an SRB1 for transmitting the RRC connection reestablishment request message.

5. The method according to claim 1, wherein after the configuring, by the communication device, the RRC connection reestablishment indication message, the method further comprises sending, by the communication device, an RRC connection reestablishment completion message, wherein the RRC connection reestablishment completion message indicates that the RRC connection reestablishment is completed.

6. A network-side device, comprising:
a receiver configured to receive a radio resource control (RRC) connection reestablishment request message, wherein the RRC connection reestablishment request message is used to request to perform RRC connection reestablishment;
a transmitter configured to send an RRC connection reestablishment indication message carrying a configuration parameter comprising at least one of a signaling radio bearer 2 (SRB2) configuration parameter or a data radio bearer (DRB) configuration parameter; and
a processor coupled to the receiver and the transmitter, wherein the processor is configured to:
determine a first integrity authentication code according to at least one of a key, an integrity protection algorithm of a source serving cell, or the RRC connection reestablishment indication message, wherein the key is a key of the source serving cell or a key obtained according to a security parameter, and the security parameter is carried in the RRC connection reestablishment indication message, or the security parameter is carried in a packet data convergence protocol (PDCP) protocol data unit (PDU) corresponding to the RRC connection reestablishment indication message;

add the first integrity authentication code to the RRC connection reestablishment indication message or the PDCP PDU corresponding to the RRC connection reestablishment indication message; and determine the RRC connection reestablishment indication message according to the RRC connection reestablishment request message.

7. The network-side device according to claim 6, wherein the processor is further configured to encrypt the configuration parameter according to an encryption algorithm of the source serving cell and the key obtained according to the security parameter, to obtain an encrypted configuration parameter and wherein the transmitter is configured to send the security parameter and the encrypted configuration parameter.

8. The network-side device according to claim 6, wherein the transmitter is configured to send the RRC connection reestablishment indication message by using an SRB0 or an SRB1.

9. The network-side device according to claim 8, wherein when the network-side device sends the RRC connection reestablishment indication message by using the SRB1, the transmitter is further configured to send a first SRB1 configuration parameter before the receiver receives the RRC connection reestablishment request message, and wherein the first SRB1 configuration parameter is used to configure an SRB1 for transmitting the RRC connection reestablishment request message and/or an SRB1 for transmitting the RRC connection reestablishment indication message.

10. The network-side device according to claim 6, wherein the receiver is further configured to receive an RRC connection reestablishment completion message after the transmitter sends the RRC connection reestablishment indication message, and wherein the RRC connection reestablishment completion message indicates that the RRC connection reestablishment is completed.

11. A communication device, comprising:
a transmitter configured to send a radio resource control (RRC) connection reestablishment request message for requesting to perform RRC connection reestablishment;
a receiver configured to:
receive an RRC connection reestablishment indication message carrying a configuration parameter comprising at least one of a signaling radio bearer 2 (SRB2) configuration parameter or a data radio bearer (DRB) configuration parameter; and
obtain a first integrity authentication code, wherein the first integrity authentication code is carried in the RRC connection reestablishment indication message or a packet data convergence protocol (PDCP) protocol data unit (PDU) corresponding to the RRC connection reestablishment indication message; and a processor coupled to the receiver and the transmitter, wherein the processor is configured to:
determine a second integrity authentication code according to at least one of a key, an integrity protection algorithm of a source serving cell of the communication device, or the RRC connection reestablishment indication message, wherein the key is a key of the source serving cell of the communication device or a key obtained according to a security parameter, and the security parameter is carried in the RRC connection reestablishment indication message, or the security parameter is carried in the PDCP PDU corresponding to the RRC connection reestablishment indication message;
determine whether the second integrity authentication code is the same as the first integrity authentication code; and
configure the RRC connection reestablishment indication message when the second integrity authentication code is the same as the first integrity authentication code.

12. The communication device according to claim 11, wherein when a configuration parameter in the RRC connection reestablishment indication message is an encrypted configuration parameter, before configuring the RRC connection reestablishment indication message, the processor is further configured to:
obtain a first key according to the security parameter; and
decrypt the encrypted configuration parameter according to the first key and a decryption algorithm corresponding to an encryption algorithm of the source serving cell of the communication device, to obtain the configuration parameter.

13. The communication device according to claim 11, wherein the transmitter sends the RRC connection reestablishment request message by using an SRB0 or an SRB1.

14. The communication device according to claim 13, wherein when the communication device sends the RRC connection reestablishment request message by using the SRB1, the receiver is further configured to receive a first SRB1 configuration parameter before the transmitter sends the RRC connection reestablishment request message, and wherein the processor is further configured to configure, according to the first SRB1 configuration parameter, an SRB1 for transmitting the RRC connection reestablishment request message.

15. The communication device according to claim 11, wherein the transmitter is further configured to send an RRC connection reestablishment completion message after the processor configures the RRC connection reestablishment indication message, and wherein the RRC connection reestablishment completion message indicates that the RRC connection reestablishment is completed.

16. The communication device according to claim 11, wherein the configuration parameter in the RRC connection reestablishment indication message further comprises: at least one of a second SRB1 configuration parameter, a Medium Access Control (MAC) layer configuration parameter, or a physical layer configuration parameter.

* * * * *